United States Patent
Zhou et al.

(10) Patent No.: US 8,326,828 B2
(45) Date of Patent: Dec. 4, 2012

(54) METHOD AND SYSTEM FOR EMPLOYING A MULTIPLE LAYER CACHE MECHANISM TO ENHANCE PERFORMANCE OF A MULTI-USER INFORMATION RETRIEVAL SYSTEM

(75) Inventors: Nianjun Zhou, Danbury, CT (US); Dikran S. Meliksetian, Danbury, CT (US); Yang Sun, Beijing (CN); Chuan Yang, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 1356 days.

(21) Appl. No.: 12/014,221

(22) Filed: Jan. 15, 2008

(65) Prior Publication Data
US 2009/0182946 A1 Jul. 16, 2009

(51) Int. Cl.
*G06F 7/00* (2006.01)
(52) U.S. Cl. .......................... 707/725; 711/119
(58) Field of Classification Search .......... 707/725, 707/736; 711/719
See application file for complete search history.

(56) References Cited

U.S. PATENT DOCUMENTS

| | | | |
|---|---|---|---|
| 6,122,626 A * | 9/2000 | Brandsma | 707/3 |
| 6,848,076 B1 | 1/2005 | Genty et al. | |
| 7,007,237 B1 | 2/2006 | Sharpe | |
| 7,152,165 B1 * | 12/2006 | Maheshwari et al. | 713/193 |
| 7,933,896 B2 * | 4/2011 | Dexter | 707/722 |
| 2004/0015503 A1 * | 1/2004 | Smith et al. | 707/100 |
| 2005/0267878 A1 * | 12/2005 | Mogi et al. | 707/3 |
| 2006/0069517 A1 * | 3/2006 | Thorsted et al. | 702/19 |
| 2006/0069617 A1 | 3/2006 | Milener et al. | |
| 2009/0198748 A1 * | 8/2009 | Ash et al. | 707/204 |

OTHER PUBLICATIONS

Patterson et al., "Informed Prefetching and Caching", 1999, ACM, p. 79-95.*
Deshpande et al.,"Caching Multidimensional Queries Using Chunks", 1998, ACM.*
Degenaro et al., "A Middleware System Which Intelligently Caches Query Results", 2000, Springer-Verlag Berlin Heidelberg.*
Javed I. Khan; Active Streaming in Transport Delay Minimization; 2000 IEEE; pp. 95-102.
Padmanabhan et al.;Using Predictive Prefetchng to Improve World Wide Web Latency; ACM SIGCOMM, Computer Communication Review; pp. 22-36.

(Continued)

*Primary Examiner* — Shahid Alam
*Assistant Examiner* — Dawaune Conyers
(74) *Attorney, Agent, or Firm* — Schmeiser, Olsen & Watts; Arthur J. Samodovitz

(57) ABSTRACT

A method and system for optimizing resource usage in an information retrieval system. Meta information in query results describes data items identified by identifiers. A chunk of the identifiers and a set of meta information are loaded into a first cache and a second cache, respectively. A portion of the set of meta information is being viewed by a user. The portion describes a data item identified by an identifier included in the chunk and in a sub-chunk of identifiers that identifies data items described by the set of meta information. If a position of the identifier in the sub-chunk satisfies a first criterion, then a second set of meta information is preloaded into the second cache. If a position of the identifier in the chunk satisfies a second criterion, then a second chunk of the identifiers is preloaded into the first cache.

20 Claims, 12 Drawing Sheets

OTHER PUBLICATIONS

Alexander P. Pons; Object Prefetching Using Semantic Links; The Data Base for Advances in Information Systems—Winter 2006, vol. 37, No. 1; pp. 97-109.

Brian D. Davison; Predicting Web Actions from HTML Content; HT'02, Jun. 11-15, 2002, College Park, Maryland, USA; Copyright 2002 ACM; pp. 159-168.

Benson et al.; Multimedia Data Management for Process Control; 1994 IEEE; pp. 332-341.

Obendorf et al.; Comparing link Marker Visualization Techniques—Changes in Reading Behavior; WWW 2003, May 20-24, 2003, Budapest, Hungary; pp. 736-745.

* cited by examiner

US 8,326,828 B2

METHOD AND SYSTEM FOR EMPLOYING A MULTIPLE LAYER CACHE MECHANISM TO ENHANCE PERFORMANCE OF A MULTI-USER INFORMATION RETRIEVAL SYSTEM

FIELD OF THE INVENTION

The present invention relates to a method and system for improving performance of a computer-based information retrieval system, and more particularly to a technique for employing multiple cache layers to optimize information technology (IT) resource usage in an information retrieval system.

BACKGROUND OF THE INVENTION

In a conventional web-based information retrieval (IR) system, an end user who wants to view meta (i.e., description) information or the full contents of a stored data item sends a query to a backend system and then utilizes a browser to view the results of the query. As the number of stored data items increases and as the number of end users performing similar searches for stored data items increases, the risk of overloading IR system resources and rendering the IR system inoperable also increases. Known approaches for addressing the aforementioned risk and maintaining operability of IR systems include adding computing resources (e.g., adding computer memory, adding network bandwidth or adding central processing unit resources) or artificially limiting the size of the set of results (e.g., truncating a set of more than 500 results to a set that includes only the first 500 results). The additional computing resources approach is expensive to implement and may only be a temporary fix if, for example, the number of stored data items continues to increase. The artificial limitation approach prevents end users from finding desired results which are excluded from the artificially limited set of results. Such end users are inconvenienced either by never locating desired results or by performing the additional work of formulating a re-phrased query. Thus, there exists a need to overcome at least one of the preceding deficiencies and limitations of the related art.

SUMMARY OF THE INVENTION

The present invention provides a method of optimizing IT resource usage in an information retrieval (IR) system with multiple layers of caching. A data repository is queried by a computing system that provides the IR system, resulting in descriptions of data items (a.k.a. resulting data items). The resulting data items are included in the data repository and are identified by a set of identifiers. The computing system (e.g., web application server) loads a first chunk of the set of identifiers into a first cache. The first chunk is an ordered list of identifiers included in the set of identifiers. A set of sub-chunks is included in the first chunk. The computing system loads into a second cache a first set of meta information that describes a first set of data items of the resulting data items. The first set of data items is identified by a first sub-chunk of the set of sub-chunks. The first sub-chunk is an ordered sub-list of the ordered list of identifiers. The computing system determines that a portion of the first set of meta information is being viewed via a web page by a user of the IR system. The aforementioned portion includes a description of a data item that is included in the first set of data items and that is identified by an identifier of the first sub-chunk. The computing system determines that a position of the identifier in first sub-chunk satisfies a first predefined criterion. In response to determining that the position of the identifier satisfies the first predefined criterion, the computing system pre-loads a second set of meta information into the second cache. The second set of meta information describes a second set of data items of the resulting data items. The computing system determines that a portion of the second set of meta information is being viewed via a second web page by the user. The portion of the second set of meta information describes a data item of the second set of data items, where the data item is identified by a second identifier included in the first chunk. The computing system determines that a position of the second identifier in the first chunk satisfies a second predefined criterion. In response to determining that the position of the second identifier satisfies the second predefined criterion, the computing system pre-loads a second chunk of the set of identifiers into the first cache.

A system and computer program product corresponding to the above-summarized method are also described and claimed herein.

Advantageously, the present invention reduces memory and network resource contention at the middleware layer of an enterprise-wide IR system. Further, the present invention optimizes resource usage in an IR system without sacrificing a user's perceived response time or with a minimal impact on such response time. Still further, the present invention automatically and dynamically tracks and applies usage patterns of multiple users to continuously provide efficient resource usage in an IR system. Moreover, the present invention efficiently loads and pre-loads chunks of identifiers and sets of meta information associated with sub-chunks of identifiers without requiring the loading of all identifiers of data items that satisfy a query and without requiring the loading of all meta information related to the data items that satisfy a query, thereby reducing the operating cost of IR infrastructure.

DETAILED DESCRIPTION OF THE INVENTION

1 Overview

The present invention provides an automatic optimization of memory and network resource usage by multiple users who query an information retrieval (IR) system to retrieve the contents of data items. Based on measurements of usage patterns representing collective user behavior, the method and system disclosed herein utilizes a configurable a block of memory to load and pre-load (a.k.a. pre-fetch) automatically determined chunks (i.e., ordered lists) of identifiers of data items that satisfy users' queries. Furthermore, the present invention automatically determines sub-chunks of the chunks of identifiers and loads and pre-loads sets of meta information associated with the sub-chunks in another configurable block of memory. Each sub-chunk is an ordered sub-list of one of the aforementioned ordered lists of identifiers. The pre-loading of chunks and meta information associated with sub-chunks is based on predefined criteria. The memory and network resources are optimized by the present invention without negatively affecting or by minimally impacting a user's perceived response time (i.e. the waiting time required if the cached information does not satisfy the needs of the end user). Usually, there is no waiting time due to the fact that the mouse movement of a human being typically is much slower than the reaction of the IR system when the cache sizes are properly configured Network resource optimization is based on data exchange of network communication from/to the web to/from a backend system (a.k.a. backend layer). Memory resource optimization is based on an amount of memory used to cache the contents of data items.

2 Resource Usage Optimization System

Figure 1:
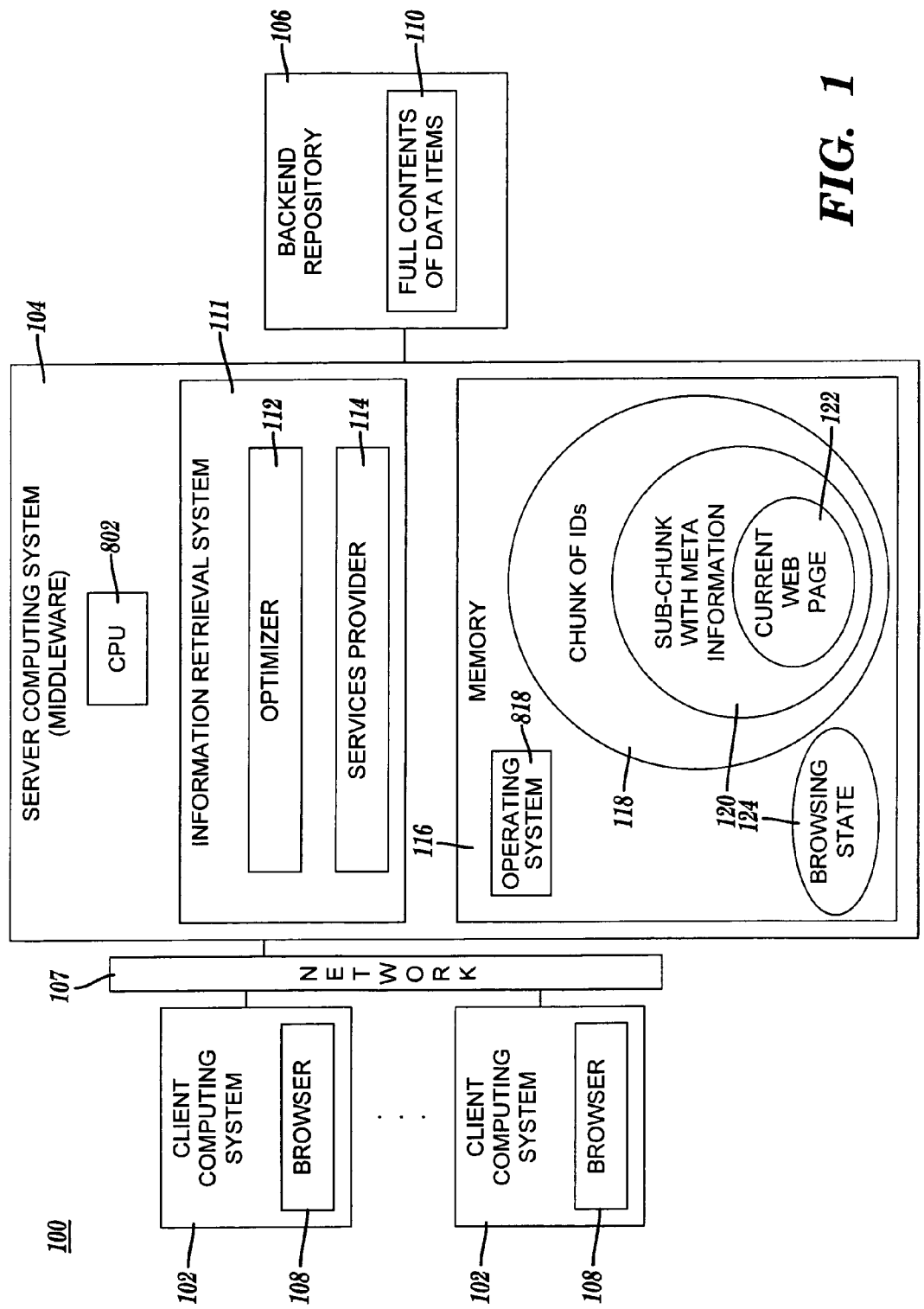
FIG. 1 is a block diagram of a system for optimizing resource usage in a multi-user information retrieval system, in accordance with embodiments of the present invention.

FIG. 1 is a block diagram of a system for optimizing resource usage in a multi-user information retrieval system, in accordance with embodiments of the present invention. System 100 includes a client computing system 102, server computing system 104 and a backend data repository 106.

Multiple client computing systems 102 communicate with server computing system 104 via a network 107 (e.g., the Internet). Each client computing system 102 includes a web browser 108 (e.g., Microsoft® Internet Explorer®). The multiple client computing systems 102 may be homogeneous or heterogeneous computing systems (e.g., personal computers and/or workstations). The web browsers 108 included in the multiple client computing systems 102 may be implemented by the same web browser product or by two or more different web browser products. Backend repository 106 is coupled to a backend system (not shown), which is part of server computing system 104. In one embodiment, server computing system 104 is a web application server.

Backend repository 106 includes the full contents of a plurality of data items 110 managed by server computing system 104. Data items 110 are included, for example, in more than 1 million records of backend repository 106. Backend repository 106 also includes unique content identifiers (IDs) of data items 110 and sets of content meta information that describe the full contents of data items 110. Hereinafter, a content identifier is also referred to simply as an identifier and content meta information is also referred to simply as meta information. As used herein, a set of meta information associated with a data item is defined to be a set of one or more pre-defined attributes of the data item. The set of one or more pre-defined attributes is not the full contents of the data item, but rather is used to describe the data item in results of a query. Viewing the one or more attributes in the results of a query facilitates a user deciding whether or not the data item is an item of interest to the user and whether or not to view the full contents of the data item. For example, if data items 110 include documents, then a set of meta information describing the documents may include the name of the author of the document and the date of the document.

Server computing system 104 includes a central processing unit (CPU) 802, an information retrieval (IR) system 111 and a memory 116. CPU 802 is described in more detail below relative to FIG. 8. IR system 111 receives multiple queries from multiple users utilizing the multiple browsers 108 residing on the multiple client computing systems 102. Each of the received queries requests the IR system 111 to retrieve descriptions of a subset of data items (a.k.a. query results) from data items 110, where the subset of data items satisfies the query. The query results may be ordered by the IDs of the subset of data items that satisfies the query.

IR system 111 includes an optimizer 112 and a services provider 114. Memory 116 includes an operating system 818, caches 118, 120 and 122 and a browsing state 124. For each user of the multiple users who send queries to IR system 111, cache 118 stores a chunk (i.e., a current chunk) of identifiers that identify a plurality of data items included in the full contents of data items 110. Hereinafter, a current chunk of identifiers is also referred to simply as a current chunk.

As one example, the size of a data item's identifier provided by the IBM® Content Management system is about 100 bytes. The IBM® Content Management system is offered by International Business Machines Corporation located in Armonk, N.Y.

Furthermore, for each user of the multiple users of IR system 111 (see FIG. 1), cache 120 stores a sub-chunk (a.k.a. a current sub-chunk) of identifiers, where the current sub-chunk is a subset of the current chunk.

Cache 118 also stores a next chunk (a.k.a. subsequent chunk) of identifiers for a subset of users of the multiple users who are viewing query results associated with identifiers that are near the end of the current chunk associated with the user. Hereinafter, a next chunk of identifiers is also referred to simply as a next chunk. Determining whether or not a user is viewing query results associated with identifiers that are near the end of a current chunk is based on a predefined criterion. The members of the subset of users for whom next chunks are stored in cache 118 may change over time (see, e.g., FIG. 2B and the related discussion below).

Each chunk stored in cache 118 is separated into a plurality of sub-chunks of identifiers (a.k.a. sub-chunks). Each sub-chunk identifies a subset of data items included in the aforementioned plurality of data items.

For each of the aforementioned users, cache 120 stores a set of meta information that describes a subset of data items identified by the current sub-chunk associated with the user. Such a set of meta information that describes a subset of data items identified by a current sub-chunk of identifiers is also referred to herein as a sub-chunk of meta information, a sub-chunk with meta information, and a sub-chunk for meta information. As one example, a part of a set of meta information that describes one data item is typically 200-500 bytes.

Cache 120 also stores next sets of meta information for a subset of the aforementioned users, where any given user in the subset is viewing query results describing data items that are identified by identifiers that are near the end of the current sub-chunk associated with the given user. Determining whether or not a user is viewing query results associated with identifiers that are near the end of a current sub-chunk is based on a predefined criterion. The members of the subset of users for whom next sets of meta information are stored in cache 120 may change over time.

It should be noted that one or more of the members of the subset of users for whom next sets of meta information are stored in cache 120 may be different from the members of the subset of users for whom next chunks of identifiers are stored in cache 118. Further, one or more members of the subset of users for whom next chunks of identifiers are stored in cache 118 may be different from the members of the subset of users for whom next sets of meta information are stored in cache 120. Still further, the subset of users for whom next sets of meta information are stored in cache 120 may be identical to the subset of users for whom next chunks of identifiers are stored in cache 118.

For a given user of the aforementioned multiple users, cache 122 stores a portion of the meta information that is stored in cache 120 for the same user and that is to be displayed on a web page that includes query results. The portion of the meta information stored in cache 122 is of a predetermined size (e.g., a predefined number of results of a query). Cache 122 may also store other data that together with the aforementioned portion of meta information is included in the web page that displays to the user the query results (i.e., results of one of the aforementioned multiple queries received by IR system 111). The stored portion of the meta information includes one or more descriptions of one or more data items included in the aforementioned subset of data items that is identified by a current sub-chunk associated with a user.

In one embodiment, cache 122 also stores a next portion of the meta information stored in cache 120, where the next portion of meta information is used to present a next portion of the query results on the web page.

Optimizer 112 includes a cache manager (not shown) and an activity analyzer (not shown). The cache manager manages the contents of caches 118, 120 and 122, which includes determining the size of the caches and determining when the caches need to be purged. The activity analyzer receives and analyzes query statistics and usage patterns of the multiple users who send the multiple queries to IR system 111. The query statistics include the number of data items associated with the results of a query.

The aforementioned usage patterns include the frequency usage distribution of three scenarios (i.e., scenarios A, B and C). In scenario A, an end user's browsing through web pages containing the results of a query finds the data item of interest to him/her or terminates the search for the data item of interest without browsing through a number of web pages that requires a pre-loading of additional meta information associated with a subsequent sub-chunk of identifiers based on a first predefined criterion or a pre-loading of a subsequent chunk of identifiers based on a second predefined criterion. Scenario A is described in detail below relative to FIG. 4.

In scenario B, an end user browses through a number of web pages that require the pre-loading of additional meta information associated with a subsequent sub-chunk of identifiers of data items associated with the query results, where the pre-loading is based on the aforementioned first predefined criterion. Scenario B is described in detail below relative to FIGS. 5A-5B.

In scenario C, an end user browses through a number of web pages that requires the pre-loading of a subsequent chunk of identifiers of data items described by the query results, where the pre-loading is based on the aforementioned second predefined criterion. Scenario C is described in more detail below relative to FIGS. 6A-6B.

The usage of resources (e.g., amount of memory) by IR system 111 and network efficiency are optimized by making scenario A the most likely of the aforementioned three scenarios. To make scenario A the most likely scenario, the activity analyzer determines an optimal size of the chunk, an optimal size of the sub-chunk and the optimal number of results to include in each web page being displayed to a user.

Services provider 114 provides browsing service support (e.g., support for rendering web pages) and data retrieval support. The data retrieval support includes composing queries, ordering queries, and retrieving the following data from backend repository 106: identifiers of data items, meta information that describes data items, and full contents of data items 110. Services provider 114 also includes a data integrator that maintains data integrity in response to one or more data items included in data items 110 being updated. Data stored in backend repository 106 is accessed by IR system 111, for example, via a relational database management system (RDBMS), Lightweight Directory Access Protocol (LDAP) or a content management product built upon RDBMS or LDAP (e.g., IBM® Content Manager).

Browsing state 124 includes a set of indicators for each user of the multiple users. A set of indicators in browsing state 124 includes (1) the current chunk of identifiers that identify a plurality of data items included in data items 110 and that are loaded in cache 118; (2) the current sub-chunk of the current chunk, where the current sub-chunk identifies data items that are described by a set of meta information loaded in cache 120; and (3) the current web page whose contents are loaded in cache 122 and which is being displayed to a user.

2.1 Conceptual View of Cache Management

Figure 2A:
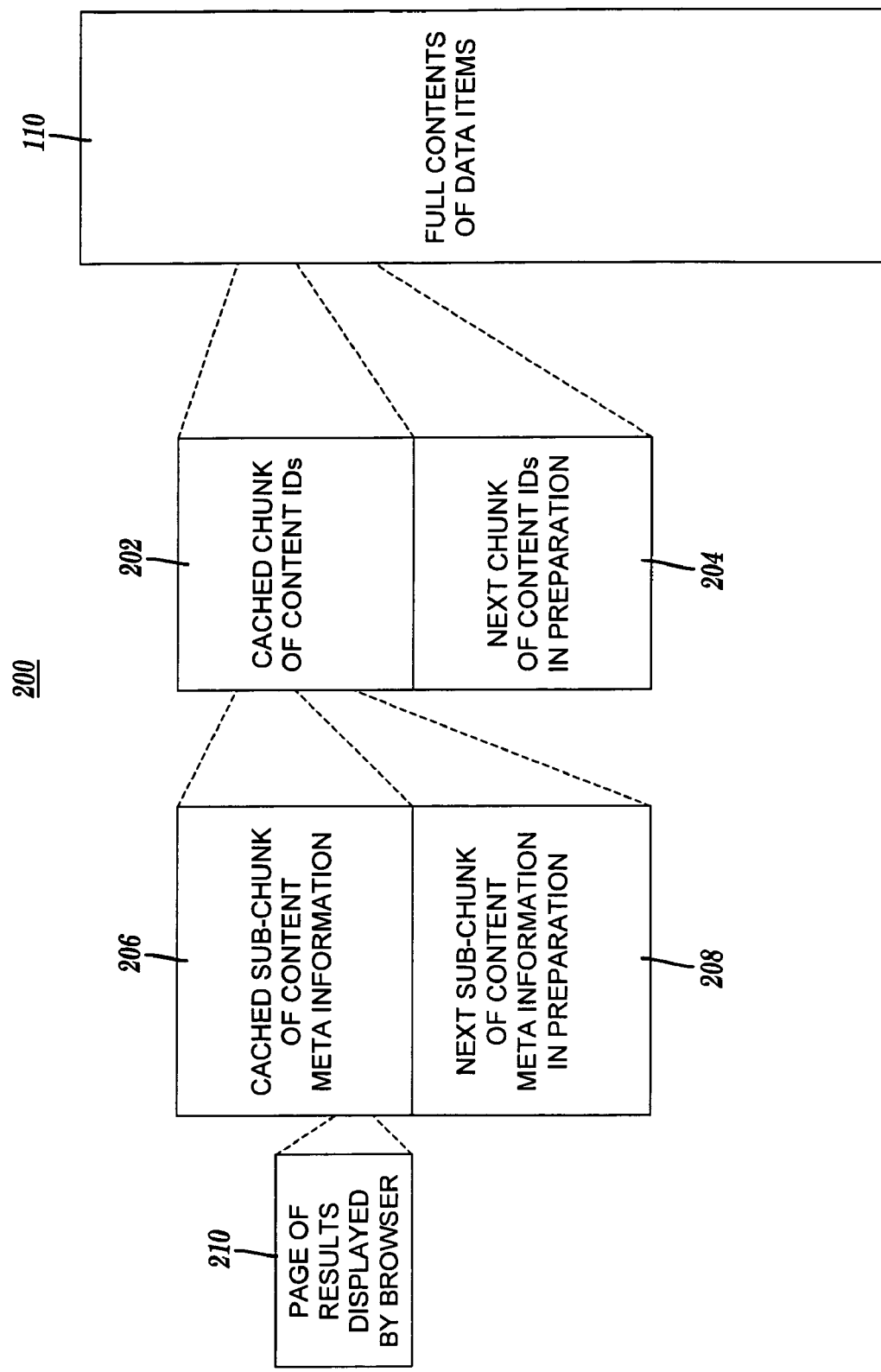
FIG. 2A depicts a conceptual view of cache management provided by the system of FIG. 1, in accordance with embodiments of the present invention.

FIG. 2A depicts a conceptual view of cache management provided by the system of FIG. 1, in accordance with embodiments of the present invention. Conceptual view 200 includes the full contents of data items 110, a cached current chunk of identifiers (IDs) 202, a next chunk of IDs 204, a cached current sub-chunk of meta information 206, a next sub-chunk of meta information 208 and a current web page of results 210 displayed by browser 108 (see FIG. 1). The result of a query generated by IR system 111 (see FIG. 1) includes a plurality of resulting data items that are a strict subset of data items 110. Cached chunk of IDs 202 is stored in cache 118 (see FIG. 1) and identifies a current set of data items included in the plurality of resulting data items, as indicated by the dashed lines connecting chunk 202 and a section of data items 110.

Next chunk of IDs 204 is determined by IR system 111 (see FIG. 1) to identify a next set of data items included in the plurality of resulting data items, as indicated by the dashed lines connecting next chunk 204 and a second section of data items 110. The next set of data items and the current set of data items are mutually exclusive. Next chunk of IDs 204 is determined in preparation of a user browsing through enough results of a query to require the pre-loading of the next chunk 204 into cache 118 (see FIG. 1).

Cached sub-chunk of meta information 206 is a set of meta information that is stored in cache 120 (see FIG. 1) and that describes a subset of the current set of data items. The subset of the current set of data items is identified by a subset of IDs included in cached chunk 202, thereby associating sub-chunk of meta information 206 with the subset of IDs included in cached chunk 202, as indicated by the dashed lines connecting cached sub-chunk 206 and a section of cached chunk 202.

Next sub-chunk of meta information 208 is determined by IR system 111 (see FIG. 1) and describes a subsequent subset of the current set of data items. The subsequent subset of the current set of data items is identified by a subsequent subset of IDs included in cached chunk 202, thereby associating next sub-chunk of meta information 208 with the subsequent subset of IDs included in cached chunk 202, as indicated by the dashed lines connecting next sub-chunk of meta information 208 to a second section of cached chunk 202. The IDs associated with the next sub-chunk of meta information 208 and the IDs associated with the cached sub-chunk of meta information 206 are mutually exclusive. The next sub-chunk of meta information 208 is determined in preparation of a user browsing through enough results of a query to require the pre-loading of next sub-chunk of meta information 208 into cache 120 (see FIG. 1).

The content of current web page of results 210 includes a subset of cached sub-chunk of meta information 206, as indicated by the dashed lines connecting web page of results 210 to a section of cached sub-chunk of meta information 206.

2.2 Caching Chunks for Multiple Users

Figure 2B:
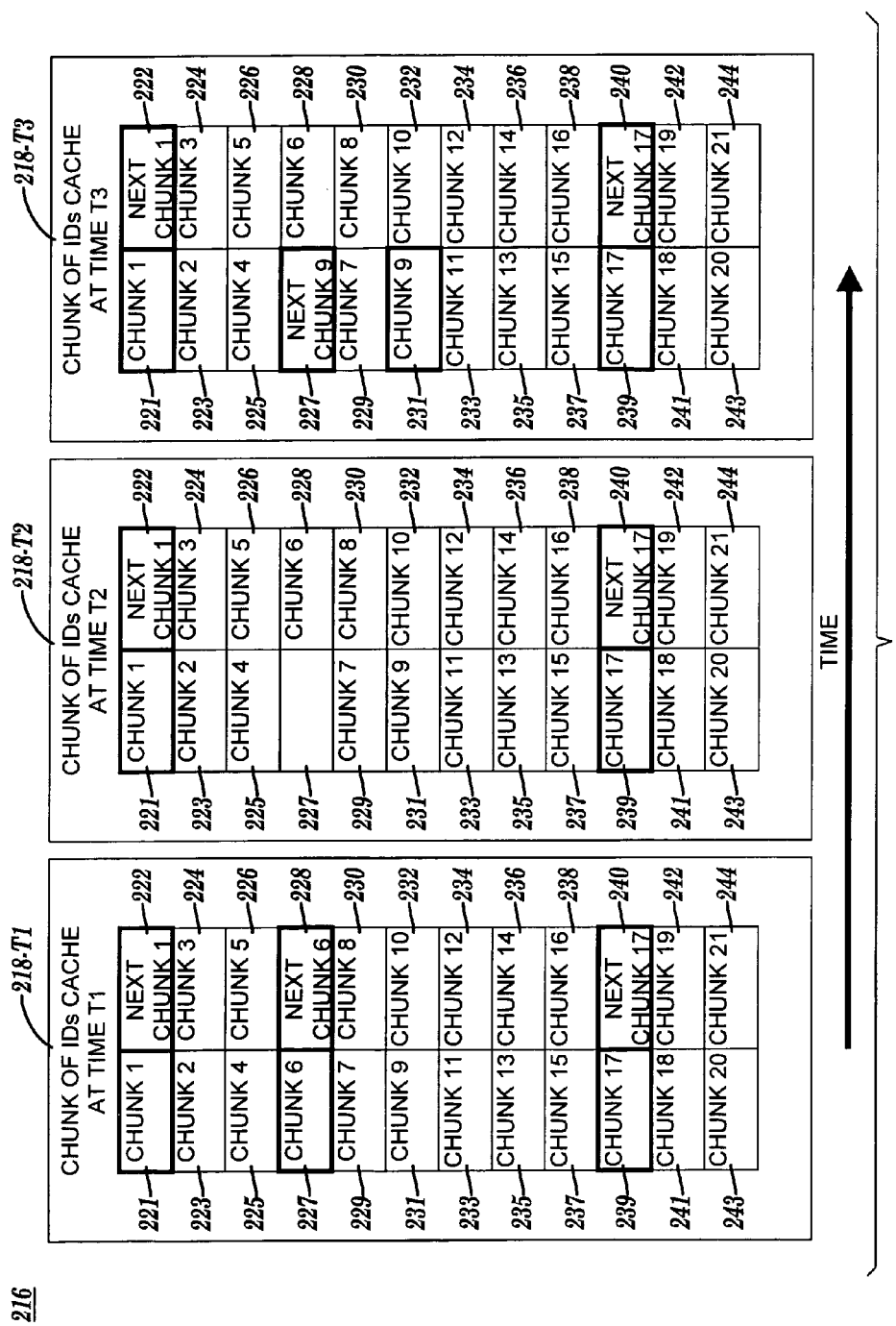
FIG. 2B depicts an exemplary cache storing chunks for multiple users at different points in time, in accordance with embodiments of the present invention.

FIG. 2B depicts an exemplary cache storing chunks for multiple users at different times, in accordance with embodiments of the present invention. A series of views 216 of an exemplary cache that includes chunks of IDs (i.e., an example of cache 118 of FIG. 1) includes a first view of the chunk of IDs cache 218-T1 showing the contents of the cache at a time T1, a second view of the chunk of IDs cache 218-T2 showing the contents of the cache at a time T2, and a third view of the chunk of IDs cache 218-T3 showing the contents of the cache at a time T3, where T1<T2<T3. Each view of the chunk of IDs cache in FIG. 2B includes 24 memory blocks 221-244. The labels shown in memory blocks 221-244 indicate the contents (i.e., current chunks of IDs or next chunks of IDs) of the memory blocks at the given time T1, T2 or T3. The numerals in the labels of memory blocks 221-244 indicate a specific session of multiple concurrent information retrieval sessions being processed by IR system 111 (see FIG. 1) and a particular user of multiple users of IR system 111 (see FIG. 1). For example, CHUNK 1 in memory block 221 indicates a current chunk of IDs for session 1 associated with a first user of IR system 111 (see FIG. 1) and CHUNK 20 in memory block 243 indicates a current chunk of IDs for session 20 associated with a 20$^{th}$ user of IR system 111 (see FIG. 1).

Cache 218-T1 depicts current chunks of IDs stored for 21 users of 21 concurrent sessions being processed by IR system 111 (see FIG. 1). In this example, historical usage patterns of the multiple users of IR system 111 (see FIG. 1) indicated a need for the 24 memory blocks 221-244. That is, 21 memory blocks are needed to store the 21 current chunks of IDs for the 21 current concurrent users and the usage patterns indicate that, at any given time, 3 additional memory blocks are sufficient to accommodate any next chunks of IDs that may need to be pre-loaded for any of the 21 concurrent users. In other words, the usage patterns indicate that it is likely that at any given time 3 or fewer of the 21 concurrent users are viewing query results associated with identifiers that are near the end of a current chunk of IDs.

Prior to time T1, three users (i.e., user 1, user 6 and user 17) of the aforementioned 21 concurrent users browsed through enough query results so that for each of the three users, a next chunk of IDs needed to be pre-loaded into the cache. At time T1, next chunks of IDs are pre-loaded for users 1, 6 and 17 in preparation of the likelihood that each of the users 1, 6 and 17 will eventually view query results associated with the corresponding next chunk of IDs. The pre-loading of the next chunk of IDs for users 1, 6 and 17 resulted in the following pre-loading into cache 218-T1: NEXT CHUNK 1 is pre-loaded into memory block 222, NEXT CHUNK 6 is pre-loaded into memory block 228 and NEXT CHUNK 17 is pre-loaded into memory block 240.

In between time T1 and time T2, user 6 stops viewing query results associated with the current chunk stored in memory block 227 of cache 218-T1 and initiates viewing query results associated with the next chunk stored in memory block 228. In response to viewing the query results associated with the next chunk, optimizer 112 (see FIG. 1) designates memory block 228 as the current chunk for user 6 (see memory block 228 labeled CHUNK 6 in cache 218-T2). After a predefined amount of time following the designation of the new current chunk for user 6, IR system 111 (see FIG. 1) purges the contents of memory block 227 at time T2. Therefore, cache 218-T2 indicates no contents for memory block 227 (i.e., memory block 227 is blank in cache 218-T2).

In between time T2 and T3, user 9 starts to view query results associated with IDs that are near the end of the current chunk for user 9 (i.e., CHUNK 9 stored in memory block 231). In response to detecting user 9's viewing of query results associated with IDs that are near the end of CHUNK 9, optimizer 112 (see FIG. 1) pre-loads NEXT CHUNK 9 into the cache at time T3 (see NEXT CHUNK 9 in memory block 227 of cache 218-T3).

The pre-loading of next chunks is described in more detail below relative to FIGS. 6A-6B.

2.3 Caching Sub-Chunks for Multiple Users

Figure 2C:
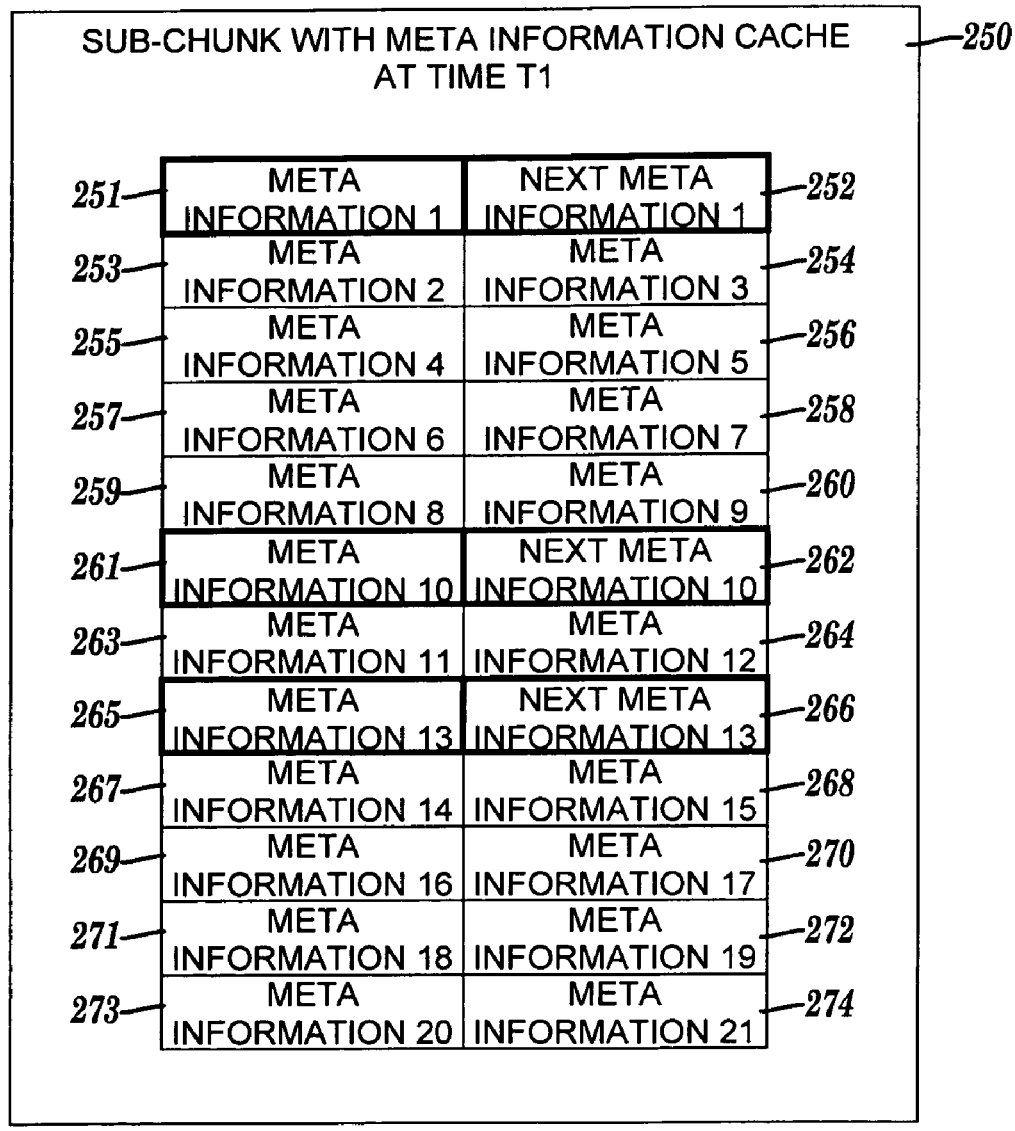
FIG. 2C depicts an exemplary cache storing meta information for multiple users at a point in time indicated in FIG. 2B, in accordance with embodiments of the present invention.

FIG. 2C depicts an exemplary cache storing meta information for multiple users at a point in time indicated in FIG. 2B, in accordance with embodiments of the present invention. Cache 250 stores sets of meta information for multiple users at time T1 and is an example of cache 120 of FIG. 1. Cache 250 includes 24 memory blocks 251-274. The labels shown in memory blocks 251-274 indicate the contents (i.e., sets of meta information associated with current or next sub-chunks of IDs) of the memory blocks at the time T1, which is the same time indicated by cache 218-T1 of FIG. 2B.

The numerals in the labels of memory blocks 251-274 indicate a specific session of multiple concurrent information retrieval sessions being processed by IR system 111 (see FIG. 1) and a particular user of multiple users of IR system 111 (see FIG. 1). For example, META INFORMATION 1 in memory block 251 indicates a set of meta information describing data items identified by identifiers of a current sub-chunk for session 1, which is associated with a first user of IR system 111 (see FIG. 1).

Cache 250 depicts sets of meta information associated with current sub-chunks of IDs for 21 users of 21 concurrent sessions being processed by IR system 111 (see FIG. 1). In this example, historical usage patterns of the multiple users of IR system 111 (see FIG. 1) indicated a need for the 24 memory blocks 251-274. That is, 21 memory blocks are needed to store the 21 sets of meta information associated with 21 current sub-chunks of IDs for the 21 current concurrent users and the usage patterns indicate that, at any given time, 3 additional memory blocks are sufficient to accommodate any meta information associated with next sub-chunks of IDs that may need to be pre-loaded for any of the 21 concurrent users. In other words, the usage patterns indicate that it is likely that at any given time 3 or fewer of the 21 concurrent users are viewing query results associated with identifiers that are near the end of a current sub-chunk of IDs.

Although the number of memory blocks in cache 250 is identical to the number of memory blocks in cache 218-T1 of FIG. 2B, the present invention contemplates other embodiments in which the number of memory blocks included in cache 250 (or cache 120 of FIG. 1) is different from the number of memory blocks included in cache 218-T1 (or cache 118 of FIG. 1).

Prior to time T1, three users (i.e., user 1, user 10 and user 13) of the aforementioned 21 concurrent users browsed through enough query results so that for each of the three users, a set of meta information (a.k.a. next meta information) associated with a next sub-chunk of IDs needed to be pre-loaded into the cache. At time T1, next meta information is pre-loaded for users 1, 10 and 13 in preparation of the likelihood that each of the users 1, 10 and 13 will eventually view query results associated with the corresponding next sub-chunk of IDs. The pre-loading of the next meta information for users 1, 10 and 13 resulted in the following pre-loading into cache 250: NEXT META INFORMATION 1 is pre-loaded into memory block 252, NEXT META INFORMATION 10 is pre-loaded into memory block 262 and NEXT META INFORMATION 13 is pre-loaded into memory block 266.

Although not shown, conditions for designating the next meta information as current meta information, purging the meta information that was formerly the current meta information, and re-using purged memory blocks for next meta information associated with another user are analogous to the conditions for current and next chunks described above relative to FIG. 2B.

It should be noted that a user for whom a next chunk has been pre-loaded may have next meta information pre-loaded (see, e.g., memory blocks associated with user 1 in cache 218-T1 of FIG. 2B and cache 250 of FIG. 2C) or may not have next meta information pre-loaded (see, e.g., memory blocks associated with user 6 in cache 218-T1 of FIG. 2B and cache 250 of FIG. 2C). Furthermore, a user for whom a next chunk has not been pre-loaded may have next meta information pre-loaded (see, e.g., memory blocks associated with user 10 in cache 218-T1 of FIG. 2B and cache 250 of FIG. 2C) or may not have next meta information pre-loaded (see, e.g., memory blocks associated with user 2 in cache 218-T1 of FIG. 2B and cache 250 of FIG. 2C).

3 Resource Usage Optimization Process

Figure 3:
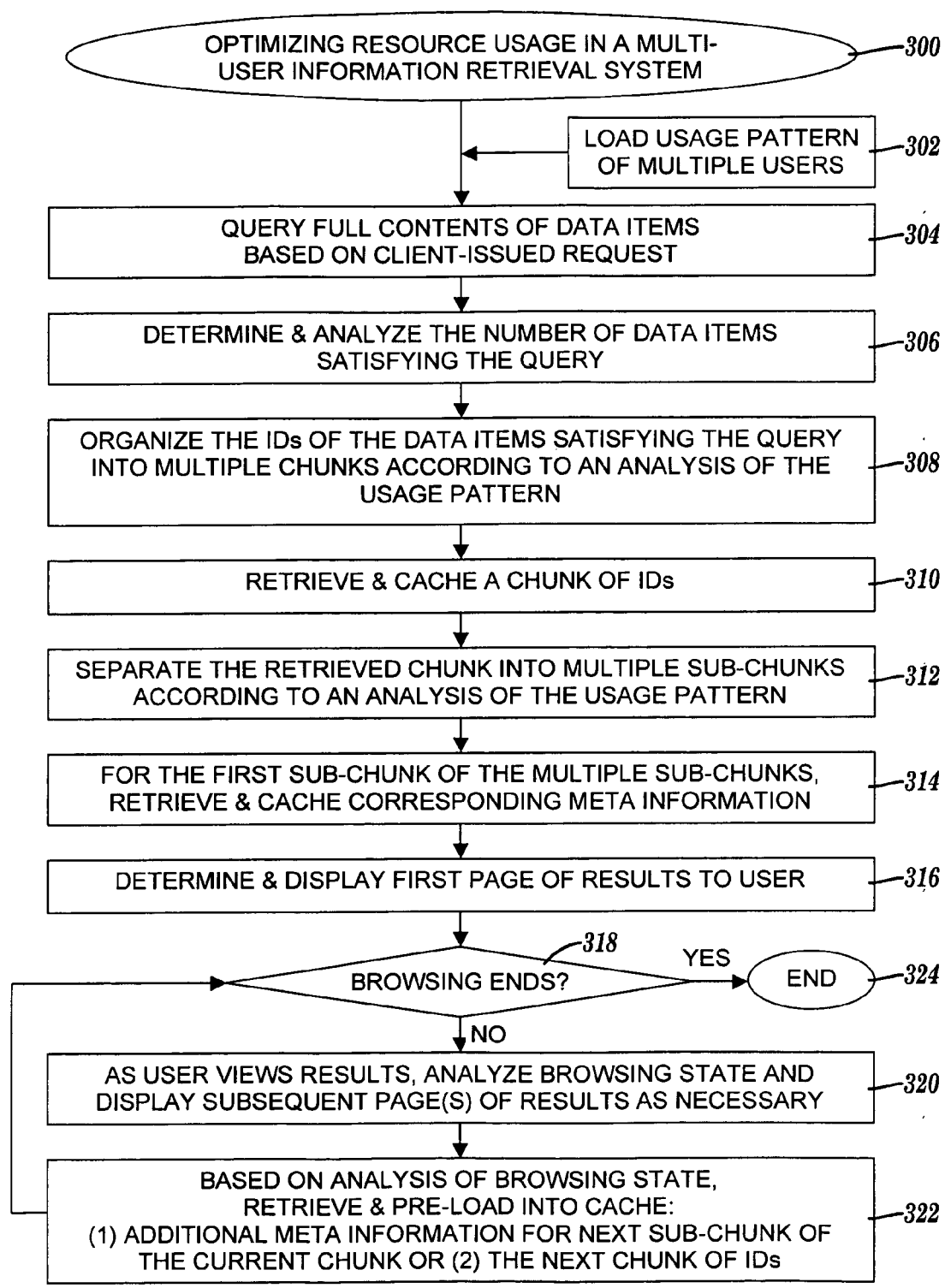
FIG. 3 is a flow diagram of a multi-user IR system resource usage optimization process implemented by the system of FIG. 1, in accordance with embodiments of the present invention.

FIG. 3 is a flow diagram of a multi-user IR system resource usage optimization process implemented by the system of FIG. 1, in accordance with embodiments of the present invention. The multi-user IR system resource usage optimization process starts at step 300. In step 302, server computing system 104 loads usage patterns for multiple users of the IR system 111 (see FIG. 1) into optimizer 112 (see FIG. 1). Following step 302 and prior to step 304, a user enters a request into client computing system 102 (see FIG. 1) to retrieve information from data items 110 (see FIG. 1). IR system 111 (see FIG. 1) receives the request of the user from client computing system 102 (see FIG. 1) via network 107 (see FIG. 1).

In step 304, a query composer service provided by services provider 114 (see FIG. 1) composes a query based on the received request. A data retrieval service provided by services provider 114 (see FIG. 1) uses the composed query to query the full contents of data items 110 (see FIG. 1).

In step 306, IR system 111 (see FIG. 1) determines the number of data items from the full contents of data items 110 (see FIG. 1) that satisfy the query. Also in step 306, an activity analyzer provided by optimizer 112 (see FIG. 1) receives and analyzes the number of data items satisfying the query.

In step 308, the activity analyzer provided by optimizer 112 (see FIG. 1) analyzes the usage patterns loaded in step 302. Also in step 308, a cache manager provided by optimizer 112 (see FIG. 1) organizes the IDs of the data items satisfying the query to define multiple chunks of IDs according the analysis of the usage patterns.

In one embodiment, the analysis of the usage patterns provides an optimal size of x IDs per chunk and step 308 divides a total of N IDs of data items satisfying the query into (m+1) chunks if r is greater than or equal to a predefined chunk ID threshold or into m chunks if r is less than the predefined chunk ID threshold, where m is the integer portion of the quotient of N/x and where r is the remainder of N/x (i.e., r=N modulo x). The predefined chunk ID threshold may be, for instance, a predetermined value or a predetermined percentage of x.

If r is greater than or equal to the predefined chunk ID threshold, then step 308 divides the N IDs into (m+1) chunks with the first chunk through the m-th chunk each including x IDs and the (m+1)-th chunk including r IDs. For example, an analysis of the usage patterns determines an optimal number of IDs per chunk to be x=10,000 and the total number of IDs N is 30,600. The predefined chunk ID threshold is 5% of x (i.e., 5% of 10,000 or 500). The value of r in this example is the remainder of N/x (i.e., the remainder of 30,600/10,000 or 600) and r is greater than the predefined chunk ID threshold (i.e., 600>500). Furthermore, m is 3 (i.e., the integer portion of 30,600/10,000). Therefore, in this example, the first, second and third chunks (i.e., the first chunk through the m-th chunk) each include x or 10,000 IDs and the fourth chunk (i.e., the (m+1)-th chunk) includes r or 600 IDs.

On the other hand, if r is less than the predefined chunk ID threshold, then step 308 divides the N IDs into m chunks with the first chunk through the (m−1)-th chunk each including x IDs and the m-th chunk including (x+r) IDs, where m and r are as defined above. For example, an analysis of the usage patterns determines an optimal number of IDs per chunk to be x=10,000 and the total number of IDs N is 30,002. In this example, the predefined chunk ID threshold is 5% of x (i.e., 5% of 10,000 or 500). The value of r in this example is the remainder of N/x (i.e., the remainder of 30,002/10,000 or 2) and r is less than the predefined chunk ID threshold (i.e., 2<500). Furthermore, the integer portion of the quotient of N/x or 30,002/10,000 is m=3. Therefore, in this example, the first and second chunks each include 10,000 IDs and the third chunk (i.e., the m-th chunk includes 10,002 IDs (i.e., (x+r) or 10,000+2 IDs). In step 310, the data retrieval service provided by services provider 114 (see FIG. 1) retrieves a chunk of IDs and stores the retrieved chunk in cache 118 (see FIG. 1). In step 312, the cache manager provided by optimizer 112 (see FIG. 1) separates the retrieved chunk to define multiple sub-chunks of IDs according to the analysis of the usage patterns performed in step 308.

In one embodiment, the analysis of the usage patterns provides an optimal number of $x_1$ IDs per sub-chunk, and step 312 divides a total of x IDs in a chunk into $m_1+1$ sub-chunks if $r_1$ is greater than or equal to a predefined sub-chunk ID threshold or into $m_1$ sub-chunks if $r_1$ is less than the predefined sub-chunk ID threshold, where $m_1$ is the integer portion of the quotient of $x/x_1$ and $r_1$ is the remainder of $x/x_1$ (i.e., $r_1 = x$ modulo $x_1$). The predefined sub-chunk ID threshold may be, for instance, a predetermined value or a predetermined percentage of $x_1$.

If $r_1$ is greater than or equal to the predefined sub-chunk ID threshold, then step 312 divides the x IDs of a chunk into $(m_1+1)$ sub-chunks with the first sub-chunk through the $m_1$-th sub-chunk each including $x_1$ IDs and the $(m_1+1)$-th chunk including $r_1$ IDs. For example, an analysis of the usage patterns determines an optimal number of IDs per sub-chunk to be $x_1=1,000$ and the total number of IDs per chunk is $x=10,200$. In this example, the predefined sub-chunk ID threshold is 50. The value of $r_1$ in this example is the remainder of $x/x_1$ (i.e., the remainder of 10,200/1,000 or 200) is greater than the predefined sub-chunk ID threshold (i.e., 200>50). Furthermore, $m_1$ is 10 (i.e., the integer portion of 10,200/1,000). Therefore, in this example, the first sub-chunk through the tenth sub-chunk (i.e., the first sub-chunk through the $m_1$-th sub-chunk) each include 1,000 IDs and the eleventh sub-chunk (i.e., the $(m_1+1)$-th chunk) includes $r_1$ or 200 IDs.

On the other hand, f $r_1$ is less than the predefined sub-chunk ID threshold, then step 312 divides the x IDs of a chunk into $m_1$ sub-chunks with the first sub-chunk through the $(m_1-1)$-th sub-chunk each including $x_1$ IDs and the $m_1$-th sub-chunk including $(x_1+r_1)$ IDs, where $m_1$ and $r_1$ are as defined above. For example, an analysis of the usage patterns determines an optimal number of IDs per sub-chunk to be $x_1=1,000$ and the total number of IDs per chunk is $x=10,002$. In this example, the predefined sub-chunk ID threshold is 50. The value of $r_1$ in this example is the remainder of $x/x_1$ (i.e., the remainder of 10,002/1,000 or 2) and $r_1$ is less than the predefined sub-chunk ID threshold (i.e., 2<50). Furthermore, the integer portion of the quotient of $x/x_1$ or 10,002/1,000 is $m_1=10$. Therefore, in this example, the first sub-chunk through the ninth sub-chunk each include 1,000 IDs and the tenth sub-chunk (i.e., the $m_1$-th chunk) includes 1,002 IDs (i.e., $(x_1+r_1)$ or 1,000+2 IDs).

In step 314, for the first sub-chunk of the multiple sub-chunks defined in step 312 the data retrieval service provided by services provider 114 (see FIG. 1) retrieves a set of meta information that describes data items identified by the identifiers of the first sub-chunk. The data retrieval service stores the retrieved set of meta information in cache 120 (see FIG. 1).

In step 316, a browsing service provided services provider 114 (see FIG. 1) determines the contents of a first web page. The contents of the first web page include a predefined number of results of the query composed in step 304 (i.e., a subset of the total number of results of the query). Hereinafter, results of the query composed in step 304 are also referred to as query results. The browsing service generates and displays the first web page to a user of IR system 111 (see FIG. 1). The user views the displayed first web page via browser 108 (see FIG. 1) of client computing system 102 (see FIG. 1).

If the IR system (see FIG. 1) determines in step 318 that the user has not completed browsing (e.g., the user has not closed the browser and has not selected an onscreen element to display the full contents of a data item), then in step 320, optimizer 112 analyzes the browsing state 124 (see FIG. 1) of the user as the user views the results of the query composed in step 304. As the user makes onscreen selections to view query results on subsequent web pages, the browsing service displays the subsequent web page(s).

If the analysis of the browsing state in step 320 determines that the user is viewing query results associated with IDs near the end of the current chunk (i.e., initially, the chunk retrieved in step 310), then the IR system 111 (see FIG. 1) pre-loads a next (i.e., subsequent) chunk into cache 118 (see FIG. 1). If the analysis of the browsing state in step 320 determines that the user is viewing query results associated with IDs near the end of the current sub-chunk (i.e., initially, the first sub-chunk identified in step 314), then the IR system 111 (see FIG. 1) pre-loads additional meta information associated with a subsequent sub-chunk into cache 120 (see FIG. 1). As the user's browsing initiates the viewing of query results associated with the next sub-chunk or the next chunk, then the cache manager updates the current sub-chunk or current chunk, respectively. The aforementioned pre-loading of cache 120 (see FIG. 1) and the updating of the current sub-chunk are discussed in detail below relative to FIGS. 5A-5B. The aforementioned pre-loading of cache 118 (see FIG. 1) and the updating of the current chunk are discussed in detail below relative to FIGS. 6A-6B.

In step 322, based on the analysis of the browsing state performed in step 320, the data retrieval service either (1) retrieves an additional set of meta information that describes data items identified by the next sub-chunk of the multiple sub-chunks defined in step 312 and stores the additional set of meta information in cache 120 (see FIG. 1), or (2) retrieves the next chunk of IDs of the multiple chunks of IDs defined in step 308 and stores the next chunk of IDs in cache 118 (see FIG. 1). After step 322, the process repeats starting at inquiry step 318.

If the IR system 111 (see FIG. 1) determines in step 318 that the user has completed browsing (e.g., the user closed the browser without finding a data item of interest to the user or the user selected an onscreen element to display the full contents of a data item that is of interest to the user), then the multi-user IR system resource usage optimization process ends in step 324.

In one embodiment, multiple iterations of the process of FIG. 3 manage multiple client-issued requests from multiple users who are requesting data from backend repository 106 (see FIG. 1). Each iteration of the process of FIG. 3 includes a new loading of usage patterns in step 302. The activity analyzer of optimizer 112 (see FIG. 1) dynamically and automatically detects and analyzes changes in the usage patterns that may occur during an iteration of the process of FIG. 3. If the detected changes satisfy predetermined criteria, the cache manager of optimizer 112 (see FIG. 1) modifies the size of the chunks in step 308 and/or modifies the size of the sub-chunks in step 312.

Usage patterns include the following data collected during the process of FIG. 3:

1. The number of sets of meta information that were loaded into cache 120 (see FIG. 1) before a user's browsing is completed.

2. The number of chunks of IDs that were loaded into cache 118 (see FIG. 1) before a user's browsing is completed.

3. The number of full content retrieval actions that were performed during a user's browsing. Full content retrieval is described below relative to FIGS. 4, 5A-5B and 6A-6B.

4. The length of time that contents of cache 118 (see FIG. 1) and cache 120 (see FIG. 1) remained in memory 116 (see FIG. 1).

5. The number of concurrent cache sets that were loaded in memory 116 (see FIG. 1). Concurrent cache sets are the multiple sets of data that are cached in caches 118 and 120 of FIG. 1 and that correspond to the multiple concurrent sessions of the multiple users of IR system 111 (see FIG. 1).

The analysis of the usage patterns includes, for example, a statistical correlation analysis of the size of cache 118 or 120 of FIG. 1 versus the average of the initial wait time to display the first web page of results and the wait time to load subsequent web pages of results. Increasing cache size results in a longer wait time for the initial web page to be loaded, while decreasing the cache size results in a shorter initial wait time, but increases the number of subsequent wait times. The cache size is optimized, for example, to minimize average wait time constrained by the total cache size not exceeding the available memory.

3.1 Example

As an example of utilizing the process of FIG. 3, consider insurance information retrieval system that is utilized by multiple insurance agents to retrieve cases from several millions of stored cases. Each stored case includes (1) a case ID, (2) a short text description (i.e., a set of meta information), and (3) images and other detailed documents related to the case. An insurance agent submits a query for retrieving information from the insurance IR system and the query results are associated with 100,000 case IDs. The backend system of server computing system 104 (see FIG. 1) returns a portion of the case IDs (i.e., a chunk of case IDs) associated with the query results (see step 310) and separates the chunk of case IDs into multiple sub-chunks of IDs (see step 312). Each chunk in this example is 10,000 IDs and each sub-chunk is 1000 IDs. The insurance IR system identifies a first sub-chunk of the returned chunk of case IDs and retrieves the short text descriptions of the first sub-chunk of IDs (see step 314). Multiple web pages are generated by the insurance IR system including a first web page being displayed to the insurance agent (see, e.g., step 316). Each web page includes 50 query results.

The insurance agent may browse through the multiple web pages with the system response time of displaying subsequent web pages being substantially fast. Based on the browsing state, the next sub-chunk of meta information and/or the next chunk of IDs are pre-loaded by the insurance IR system (see steps 320 and 322) so that the insurance IR system is ready to respond to the insurance agent's browsing activities that initiate viewing of short text descriptions associated with the next sub-chunk and/or the next chunk.

In this example, 20 web pages of query results are associated with one sub-chunk of IDs (i.e., 20 pages×50 results per page=1000 results associated with 1000 IDs of one sub-chunk) and based on a predefined criterion, the insurance IR system considers browsing on the $19^{th}$ page to indicate a position near the end of the first sub-chunk. Thus, when the insurance agent is viewing the $19^{th}$ page of query results, the insurance IR system pre-loads the next sub-chunk of IDs.

Furthermore, in this example, 200 web pages of query results are associated with one chunk of IDs (i.e., 200 pages×50 results per page=10,000 results associated with 10,000 IDs of one chunk). Based on another predefined criterion, the insurance IR system considers browsing on the $195^{th}$ page to indicate a position near the end of the first chunk. Thus, when the insurance agent is viewing the $195^{th}$ page of query results, the insurance IR system pre-loads the next chunk of IDs.

The caching method disclosed herein saves memory resources by avoiding the loading into memory the meta information for all of the data items identified by the first chunk of 10,000 IDs before the first web page is presented to the insurance agent, thereby allowing the insurance agent to view the first web page of query results quickly and have the opportunity to find a desired data item in a substantially small period of time.

3.2 Resource Usage Optimization Process—Scenario A

Figure 4:
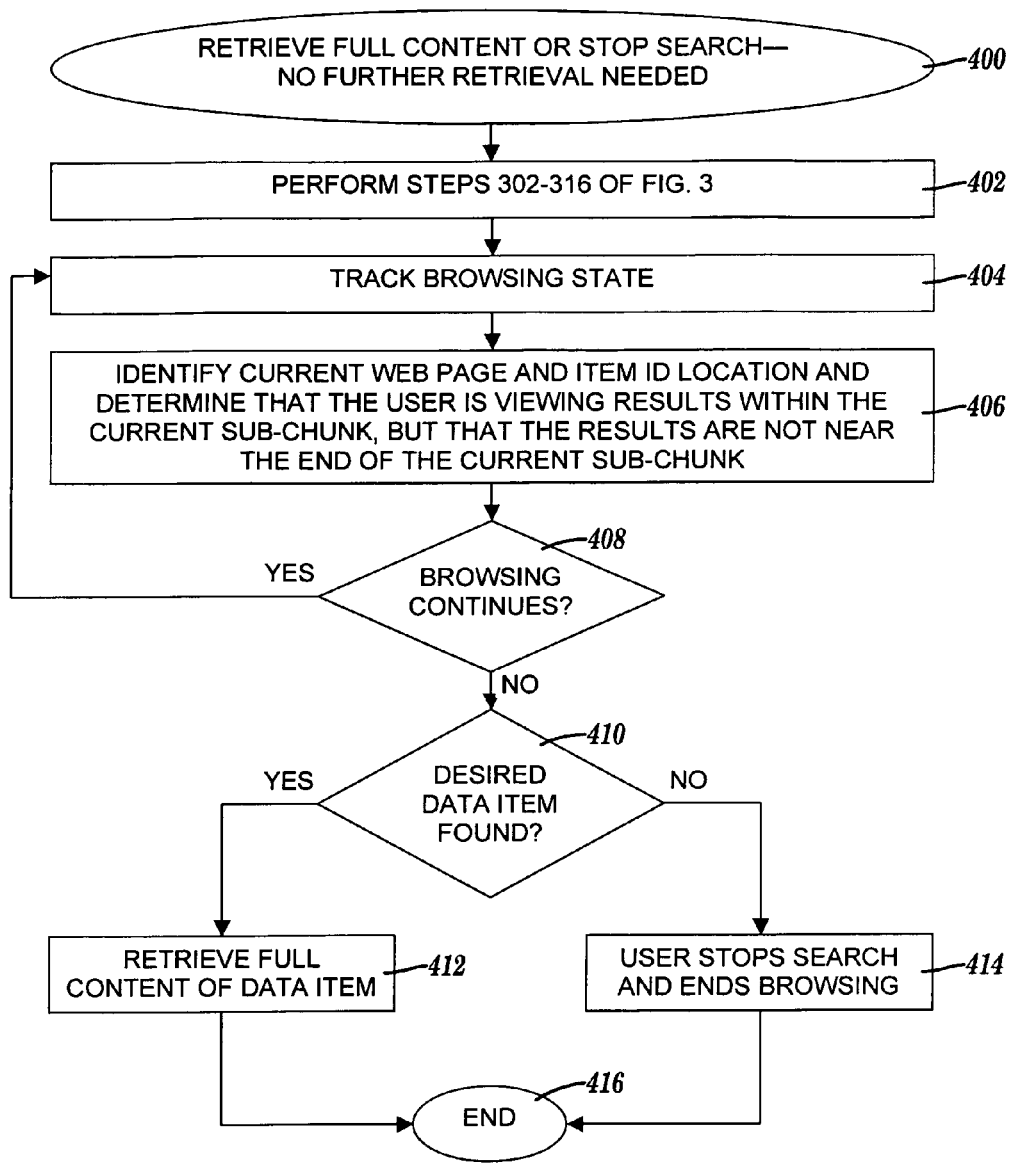
FIG. 4 is a flow diagram of a first process included in the process of FIG. 3, where the first process completes browsing without requiring retrieval of a subsequent chunk or meta information for a subsequent sub-chunk, in accordance with embodiments of the present invention.

FIG. 4 is a flow diagram of a first process included in the process of FIG. 3, where the first process completes browsing without requiring retrieval of a subsequent chunk or retrieval of meta information for a subsequent sub-chunk, in accordance with embodiments of the present invention. The process of FIG. 4 begins at step 400. In step 402, steps 302-316 of FIG. 3 are performed. In step 404, optimizer 112 (see FIG. 1) tracks the browsing state 124 (see FIG. 1) of the user of IR system 111 (see FIG. 1).

In step 406, optimizer 112 (see FIG. 1) identifies the current web page being viewed by the user, the ID of a data item being viewed by the user, and the location of the ID relative to the current chunk and the current sub-chunk. Initially, the current chunk is the chunk of IDs retrieved in step 310 of FIG. 3. Initially, the current sub-chunk is the first sub-chunk retrieved in step 314. From the location (a.k.a. position) of the ID relative to the end of the current chunk, optimizer 112 (see FIG. 1) determines that the query results being viewed by the user are not near the end of the current chunk based on a first predefined criterion. Determining whether the first predefined criterion is satisfied includes (1) determining that a number of positions between the position of the ID and the end of the current chunk is less than a predefined quantity (e.g., less than 250) or (2) determining that a ratio is less than a first predefined ratio threshold, where the ratio is a proportional amount of a first quantity relative to a second quantity. The aforementioned first quantity is the number of positions between the position of the ID and the end of the current chunk. The aforementioned second quantity is the number of positions between two predetermined identifiers of the first chunk (e.g., the number of positions between the start of the chunk and the position of the ID or the number of positions between the start of the chunk and the end of the chunk).

From the location of the ID relative to the end of the current sub-chunk, optimizer 112 (see FIG. 1) determines that the query results being viewed by the user are not near the end of the current sub-chunk based on a second predefined criterion. Determining whether the second predefined criterion is satisfied includes (1) determining that a number of positions between the position of the ID and the end of the current sub-chunk is less than a predefined quantity (e.g., less than 250) or (2) determining that a ratio is less than a second predefined ratio threshold, where the ratio is a proportional amount of a first value relative to a second value. The aforementioned first value is the number of positions between the position of the ID and the end of the current sub-chunk. The aforementioned second value is the number of positions between two predetermined identifiers of the first sub-chunk (e.g., the number of positions between the start of the sub-chunk and the position of the ID or the number of positions between the start of the sub-chunk and the end of the sub-chunk).

If IR system 111 (see FIG. 1) determines in step 408 that the user is continuing to browse through the query results, then the process of FIG. 4 repeats starting at step 404; otherwise step 410 is the next step.

If IR system 111 (see FIG. 1) determines in step 410 that the user found a data item of interest (a.k.a. desired data item) (i.e., the user selects an onscreen element to view a data item), then in step 412, the data retrieval service of services provider 114 (see FIG. 1) retrieves the full content of the data item of interest; otherwise, the user stops browsing before finding a data item of interest and IR system 111 (see FIG. 1) determines in step 414 that the user's browsing has ended. After steps 412 and 414, the process of FIG. 4 ends at step 416.

3.3 Resource Usage Optimization Process—Scenario B

Figure 5A:
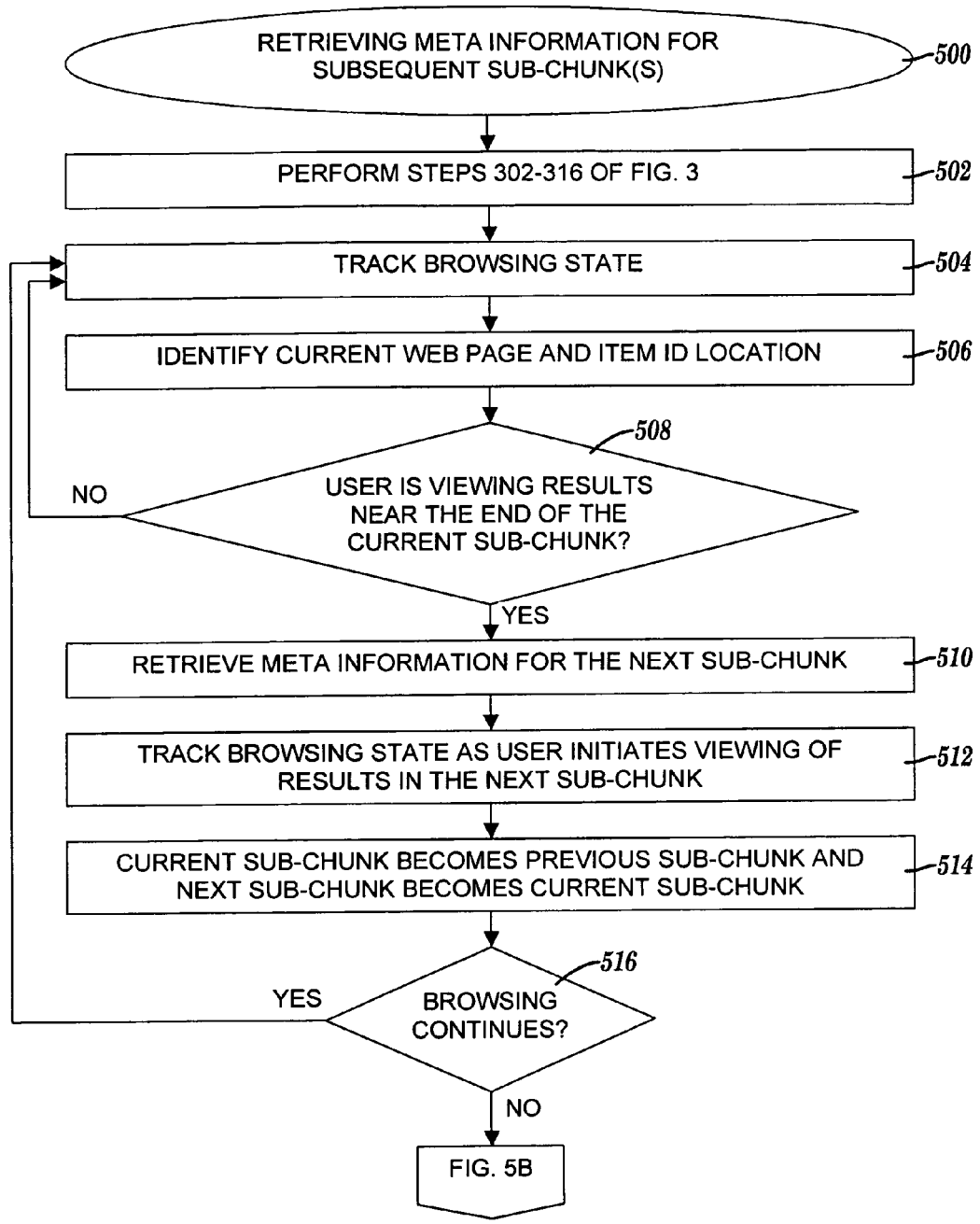
FIGS. 5A-5B depict a flow diagram of a second process included in the process of FIG. 3, where the second process includes retrieving meta information for one or more subsequent sub-chunks, in accordance with embodiments of the present invention.
Figure 5B:
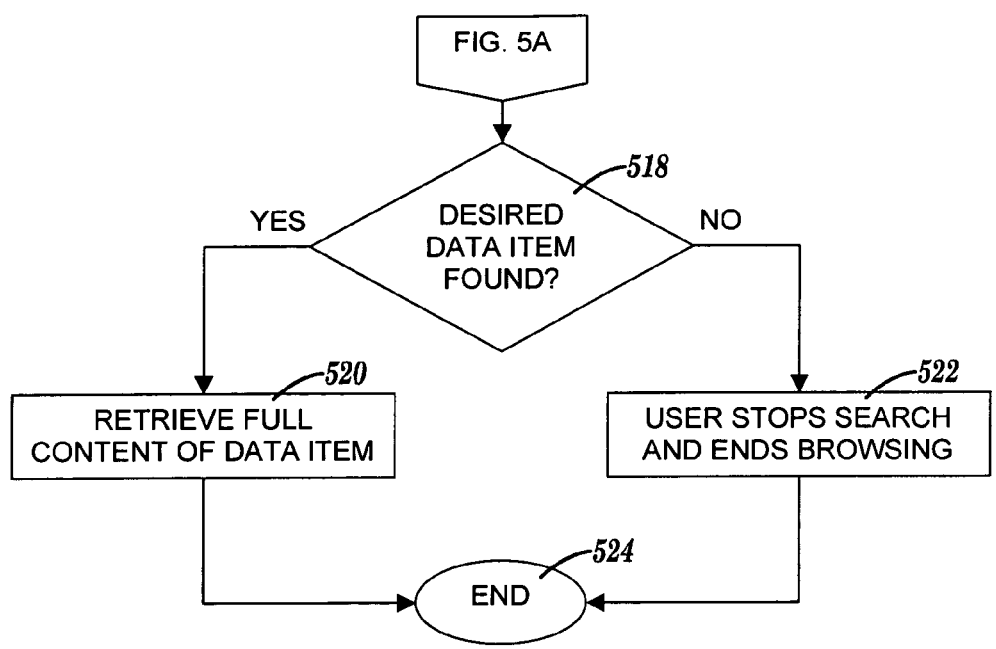

FIGS. 5A-5B depict a flow diagram of a second process included in the process of FIG. 3, where the second process includes retrieving meta information for one or more subsequent sub-chunks, in accordance with embodiments of the present invention. The process of FIGS. 5A-5B starts at step 500 of FIG. 5A. In step 502, steps 302-316 of FIG. 3 are performed. In step 504, optimizer 112 tracks the browsing state 124 (see FIG. 1) of a user of IR system 111 (see FIG. 1) who is viewing the query results on a web page.

In step 506, optimizer 112 (see FIG. 1) identifies the current web page being viewed by the user, the ID of a data item being viewed by the user, and the location of the ID relative to the current chunk and the current sub-chunk. Initially, the current chunk is the chunk of IDs retrieved in step 310 of FIG. 3. Initially, the current sub-chunk is the first sub-chunk retrieved in step 314.

If optimizer 112 (see FIG. 1) determines in step 508 that the user is viewing results near the end of the current sub-chunk based on the aforementioned second predefined criterion (see the discussion above relative to FIG. 4), then step 510 is the next step; otherwise the user's browsing continues and the process of FIGS. 5A-5B repeats starting at step 504.

In step 510, the data retrieval service of services provider 114 (see FIG. 1) receives the next sub-chunk of IDs and retrieves a set of meta information that describes data items identified by the next sub-chunk (i.e., the next sub-chunk received by the data retrieval service in step 510).

The user's browsing of the query results continues after step 510. In step 512, optimizer 112 (see FIG. 1) tracks the browsing state 124 (see FIG. 1) of the user as the user initiates viewing of query results associated with the next sub-chunk of IDs (i.e., the next sub-chunk of IDs that was received in step 510). In step 514, optimizer 112 (see FIG. 1) re-sets the current sub-chunk of IDs. That is, optimizer 112 (see FIG. 1) designates the current sub-chunk as a previous sub-chunk and designates the next sub-chunk that was received in step 510 as the current sub-chunk.

If IR system 111 (see FIG. 1) determines in step 516 that the user is continuing to browse through the query results, then the process of FIGS. 5A-5B repeats starting at step 504; otherwise, step 518 of FIG. 5B is the next step. The block of memory 116 (see FIG. 1) that includes the previous sub-chunk is purged by optimizer 112 (see FIG. 1) in response to the expiration of a predefined time period following step 516 or in response to determining that the user's continued browsing following the Yes branch of step 516 has reached a predefined location beyond the start of the current sub-chunk.

If IR system 111 (see FIG. 1) determines in step 518 that the user found a data item of interest, then in step 520, the data retrieval service of services provider 114 (see FIG. 1) retrieves the full content of the data item of interest; otherwise, the user stops browsing before finding a data item of interest and IR system 111 (see FIG. 1) determines in step 522 that the user's browsing has ended. After steps 520 and 522, the process of FIGS. 5A-5B ends at step 524.

The process of FIG. 4 may be included in the process of FIGS. 5A-5B. For example, if the user finds a data item of interest and the full contents of the data item of interest are retrieved in step 412 of FIG. 4, then the user may perform additional browsing of the query results to find one or more other data items of interest. Such additional browsing may then be tracked starting at step 504 of FIG. 5A.

As another example using the insurance IR system described above relative to FIG. 3, consider an insurance agent who is viewing query results over multiple web pages. As the short text description (i.e., meta information) that the insurance agent is currently viewing is associated with an ID near the end of the current sub-chunk of IDs, then short text descriptions for the next sub-chunk of IDs are retrieved (see step 510 of FIG. 5A). As the insurance agent's browsing stops viewing the short text descriptions of the current sub-chunk and initiates viewing of the short text descriptions of the next sub-chunk (see step 512 of FIG. 5A), then the current sub-chunk becomes a previous sub-chunk and the next sub-chunk becomes the current sub-chunk (see step 514 of FIG. 5A). In response to the expiration of a predefined time period or in response to determining that the insurance agent's browsing has reached a predefined location beyond the start of the current sub-chunk, the memory block that includes the previous sub-chunk is purged. The steps described above in this example may be repeated multiple times as long as the insurance agent is viewing query results associated only with the current chunk of IDs and not with the next chunk of IDs. The insurance agent either finds the desired case as being associated with meta information of the current sub-chunk of IDs (see the Yes branch of step 518 of FIG. 5B) or stops the search for the desired case and ends the browsing (e.g., closes the browser 108 of FIG. 1) (see step 522 of FIG. 5B). If insurance agent finds the desired case, then the full contents of the desired case are retrieved (see step 520 of FIG. 5B).

3.4 Resource Usage Optimization Process—Scenario C

Figure 6A:
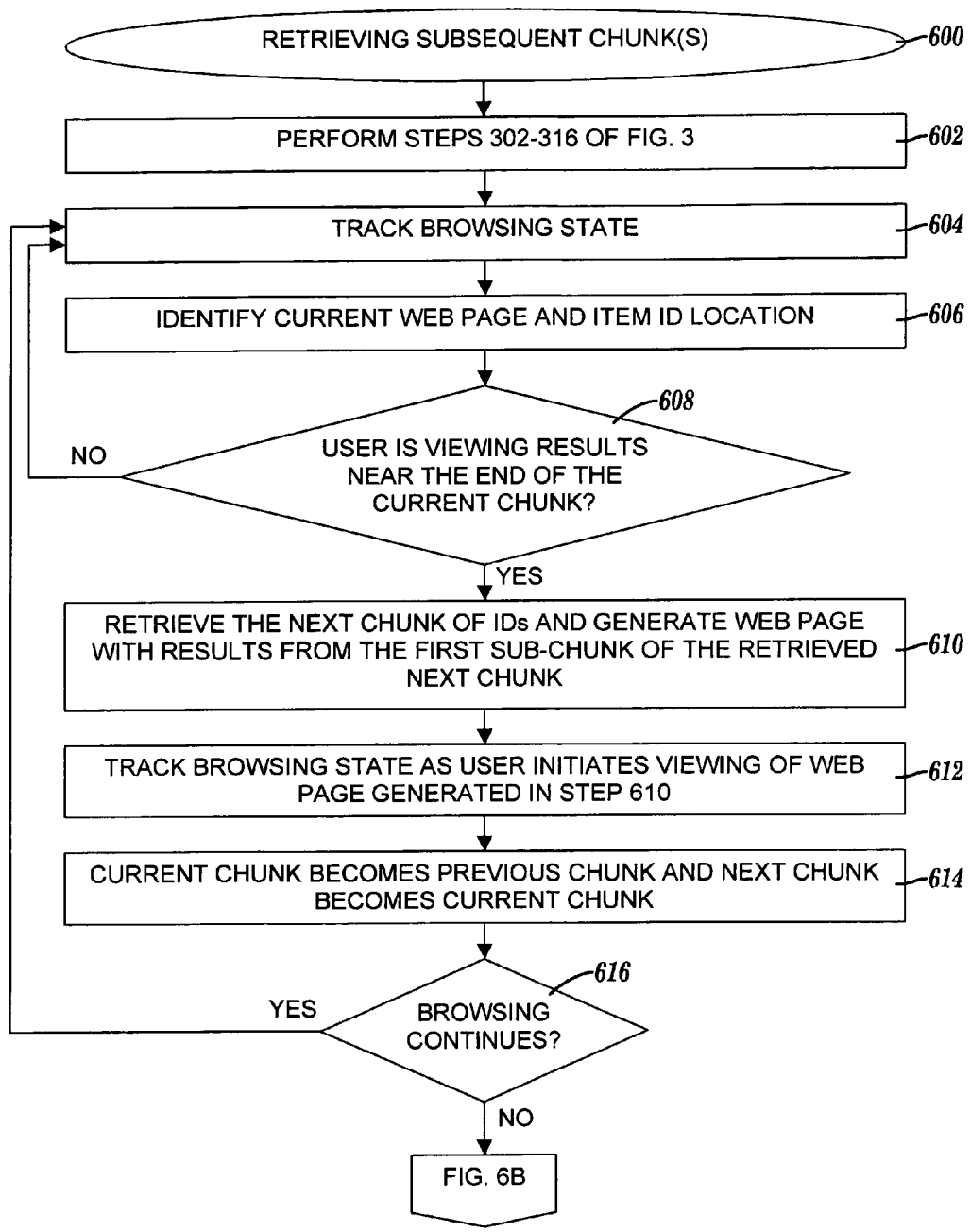
FIGS. 6A-6B depict a flow diagram of a third process included in the process of FIG. 3, where the third process includes retrieving one or more subsequent chunk(s) of identifiers of data items, in accordance with embodiments of the present invention.
Figure 6B:
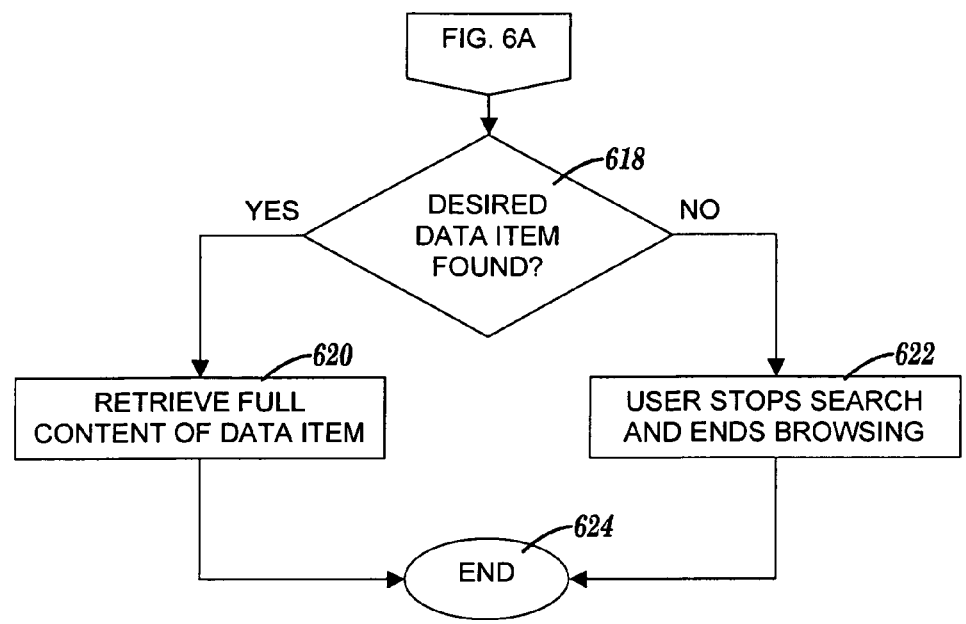

FIGS. 6A-6B depict a flow diagram of a third process included in the process of FIG. 3, where the third process includes retrieving one or more subsequent chunk(s) of identifiers of data items, in accordance with embodiments of the present invention. The process of FIGS. 6A-6B starts at step 600 of FIG. 6A. In step 602, steps 302-316 of FIG. 3 are performed. In step 604, optimizer 112 tracks the browsing state 124 (see FIG. 1) of a user of IR system 111 (see FIG. 1) who is viewing the query results on a web page.

In step 606, optimizer 112 (see FIG. 1) identifies the current web page being viewed by the user, the ID of a data item being viewed by the user, and the location of the ID relative to the current chunk and the current sub-chunk. Initially, the current chunk is the chunk of IDs retrieved in step 310 of FIG. 3. Initially, the current sub-chunk is the first sub-chunk retrieved in step 314.

If optimizer 112 (see FIG. 1) determines in step 608 that the user is viewing results near the end of the current chunk based on the aforementioned first predefined criterion (see the discussion above relative to FIG. 3), then step 610 is the next step; otherwise the user's browsing continues and the process of FIGS. 6A-6B repeats starting at step 604.

In step 610, the data retrieval service of services provider 114 (see FIG. 1) retrieves the next chunk of IDs and generates a next web page having query results associated with IDs of the first sub-chunk of the received next chunk of IDs.

The user's browsing of the query results continues after step 610. In step 612, optimizer 112 (see FIG. 1) tracks the browsing state 124 (see FIG. 1) of the user as the user initiates viewing of the next web page (i.e., the web page generated in step 610). In step 614, optimizer 112 (see FIG. 1) re-sets the current chunk of IDs. That is, optimizer 112 (see FIG. 1) designates the current chunk as a previous chunk and designates the next chunk that was retrieved in step 610 as the current chunk. Following step 614, optimizer 112 (see FIG. 1) designates the current sub-chunk as a previous sub-chunk and designates a first sub-chunk of the current chunk designated in step 614 as the current sub-chunk.

If IR system 111 (see FIG. 1) determines in step 616 that the user is continuing to browse through the query results, then the process of FIGS. 6A-6B repeats starting at step 604; otherwise, step 618 of FIG. 6B is the next step. The block of memory 116 (see FIG. 1) that includes the previous chunk is purged by optimizer 112 (see FIG. 1) in response to the expiration of a predefined time period following step 616 or in response to determining that the user's continued browsing following the Yes branch of step 616 has reached a predefined location beyond the start of the current chunk. In one embodiment, the aforementioned purging of the previous chunk is accompanied by a purging of another block of memory 116 (see FIG. 1) that includes the set of meta information associated with the previous sub-chunk.

If IR system 111 (see FIG. 1) determines in step 618 that the user found a data item of interest, then in step 620, the data retrieval service of services provider 114 (see FIG. 1)

retrieves the full content of the data item of interest; otherwise, the user stops browsing before finding a data item of interest and IR system 111 (see FIG. 1) determines in step 622 that the user's browsing has ended. After steps 620 and 622, the process of FIGS. 6A-6B ends at step 624.

The processes of FIGS. 5A-5B and FIG. 4 may be included in the process of FIGS. 6A-6B. For example, if the user finds a data item of interest and the full contents of the data item of interest is retrieved in step 520 of FIG. 5B, then the user may initiate additional browsing of the query results to find one or more other data items of interest. Such additional browsing may then be tracked starting at step 604 of FIG. 6A.

As another example using the insurance IR system described above relative to FIG. 3, consider an insurance agent who is viewing query results over multiple web pages. As the short text description (i.e., meta information) that the insurance agent is currently viewing is associated with an ID near the end of the current chunk of IDs, then the IDs of the next chunk of IDs are retrieved (see step 610 of FIG. 6A). Furthermore, a next web page is generated, where the next web page includes query results associated with IDs of the first sub-chunk of the next chunk (see step 610 of FIG. 6A). As the insurance agent's browsing stops viewing the short text descriptions of the current chunk and initiates viewing of the short text descriptions of the next chunk (see step 612 of FIG. 6A), then the current chunk becomes a previous chunk and the next chunk becomes the current chunk (see step 614 of FIG. 6A). In response to the expiration of a predefined time period or in response to determining that the insurance agent's browsing has reached a predefined location beyond the start of the current chunk, the memory block that includes the previous chunk is purged. The steps described above in this example may be repeated multiple times as the insurance agent continues to browse the query results. The insurance agent either finds the desired case as being associated with meta information of a current sub-chunk of the current chunk of IDs (see the Yes branch of step 618 of FIG. 6B) or stops the search for the desired case and ends the browsing (e.g., closes the browser 108 of FIG. 1) (see step 622 of FIG. 5B). If insurance agent finds the desired case, then the full contents of the desired case are retrieved (see step 620 of FIG. 5B).

4 Maintaining Data Integrity

Figure 7:
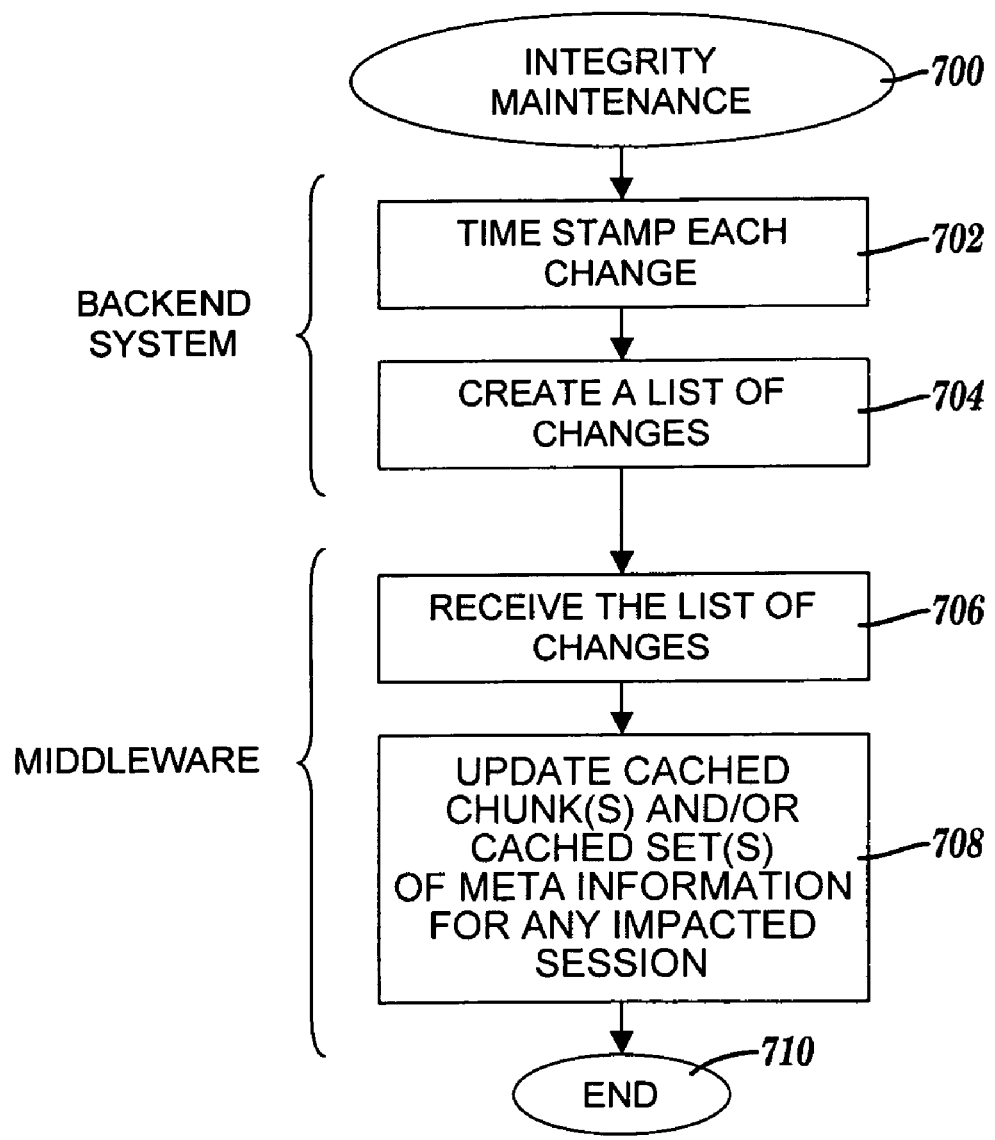
FIG. 7 is a flow diagram of a process for maintaining data integrity as data item identifiers and/or meta information change during the process of FIG. 3, in accordance with embodiments of the present invention.

FIG. 7 is a flow diagram of a process for maintaining data integrity as data item identifiers and/or meta information/content change during the process of FIG. 3, in accordance with embodiments of the present invention. The data integrity maintenance process begins at step 700. The backend system of server computing system 104 (see FIG. 1) dynamically and automatically detects any change (i.e., addition, deletion or modification) to the data in the backend repository 106 (see FIG. 1) while the resource usage optimization process of FIG. 3 is being performed (e.g., while query results are being viewed by a user). In step 702, the backend system records a time stamp for each of the detected changes. In step 704, the backend system creates a list of the detected changes. In step 706, the middleware of server computing system 104 (see FIG. 1) receives the list of changes created in step 704. In step 708, the middleware determines which chunk(s) stored in cache 118 (see FIG. 1) and/or which set(s) of meta information stored in cache 120 are affected by each of the changes on the list received in step 706. Also in step 708, the middleware updates the chunk(s) affected by each of the listed changes for any of the concurrent user sessions impacted by the change. Moreover, step 708 includes the middleware updating the set(s) of meta information affected by each of the listed changes for any of the concurrent user sessions impacted by the change. By applying this data integrity, it is assumed that the changes of items during an end user data retrieval session does not happen often.

5 Determining Cache Sizes

This section describes one example of an analysis that provides values of memory sizes for the three caches 118, 120 and 122 of FIG. 1. It should be noted that this section presents only an example of such an analysis—the present invention contemplates other approaches for determining the memory sizes of the aforementioned caches (i.e., chunk of IDs 118, sub-chunk with meta information 120, and current web page 122 of FIG. 1). Again, the cache of the current web page 122 (see FIG. 1) is part of the cache of the sub-chunk with meta information 120 (see FIG. 1). A separate cache is not needed for the current web page, but the size of the current web page cache impacts on the traffic from the web application server to the end user.

A typical session is used for the analysis in this section. The number of data items associated with meta information displayed to a browser 108 (see FIG. 1) and cached in cache 122 (see FIG. 1) is denoted as $l_b$, the number of data items described by meta information stored in cache 120 (see FIG. 1) is denoted as $l_d$, and $$\left(\left\lceil \frac{l_d}{l_b} \right\rceil + 1\right)$$

web pages can be supported without further retrieval. The number of data items identified by identifiers stored in cache 118 (see FIG. 1) is denoted by $l_i$.

The average sizes of a data item's set of meta information formatted for presentation on a web page (e.g., HTML-formatted meta information), meta information that describes a data item and an identifier of a data item are $s_b$, $s_d$ and $s_i$ bytes respectively. The total memory sizes for cache 122 (see FIG. 1), cache 120 (see FIG. 1) and cache 118 (see FIG. 1) are $m_b = l_b s_b$, $m_d = l_d s_d$, and $m_i = l_i s_i$ respectively. Only $m_d$ and $m_i$ will physically reside in the middleware memory and $m_b$ is part of $m_d$. The content for the web page will be rendered directly to the end user using network 107 (see FIG. 1) without extra memory requirement. From a usage perspective, selections of smaller $l_d$, and $l_i$ will result in a more efficient usage of memory resources.

The display time for the content of a web page to an end user is $$t_b = t_{h1} + \frac{m_b}{\lambda_1} = t_{h1} + \frac{l_b s_b}{\lambda_1}.$$

The retrieval time for a list of meta information associated with a sub-chunk is $$t_d = t_{h2} + \frac{m_d}{\lambda_2} = t_{h2} + \frac{l_d s_d}{\lambda_2},$$

and the retrieval time for a list of identifiers of a chunk is $$t_i = t_{h3} + \frac{m_i}{\lambda_2} = t_h + \frac{l_i s_i}{\lambda_2}.$$

The values $\lambda_1$ and $\lambda_2$ are the network communication speeds between the mid-tier (i.e., middleware of server computing system 104 of FIG. 1) and the client 102 (see FIG. 1) and between the mid-tier and the third tier (i.e., the backend layer of the server computing system 104 of FIG. 1), respectively. In one embodiment, the communication speed of $\lambda_1$ is slower that the communication speed of $\lambda_2$. The handshake time from the middleware to the client 102 (see FIG. 1) is denoted as $t_{h1}$. The handshake times and the processing times for the data in memory for the caching of the meta information and the identifier data are $t_{h2}$ and $t_{h3}$, respectively. Besides the communication overhead caused by fragmenting the retrievals, extra computation overhead is introduced with too many retrieval calls into the backend system. The selection of smaller numbers of $l_b$, $l_d$, and $l_i$ can result in too much communication overhead due to the increasing of the number of retrievals. Therefore, a tradeoff is to find proper values of $l_b$, $l_d$, and $l_i$.

As the identifiers of query results are ordered, a counter with value i can be assigned to the last visited query result item for each query session. The optimizer 112 (see FIG. 1) records the values of i, and generates the probability distribution of p(i). Then the probability distributions of the retrievals for the web page rendering, meta information and the identifiers are calculated as:

$$q_b(i) = \sum_{j=1}^{l_b} p((i-1)l_b + j)$$

for web page rendering, $$q_d(i) = \sum_{j=1}^{l_d} p((i-1)l_d + j)$$

for meta information, and $$q_i(i) = \sum_{j=1}^{l_i} p((i-1)l_i + j)$$

for the identifiers,

Therefore, the average traffic of the retrievals for the web page, meta information and the identifiers is calculated as:

$$T_b = m_b \sum_{i=1}^{\infty} i q_b(i)$$

for web pages, as the average traffic of web page rendering required;

$$T_d = m_d \sum_{i=1}^{\infty} i q_d(i)$$

for meta information, as the average traffic of the retrievals required for the meta information; and $$T_i = m_i \sum_{i=1}^{\infty} i q_i(i)$$

for the identifier, as the average traffic of retrievals required for the identifiers.

From the design perspective, the values of $l_b$, $l_d$, and $l_i$ need to be determined. The following weighted cost function is utilized in this example:

$$c = \alpha T_b + \beta(T_d + T_i) + \gamma(m_d + m_i)$$

In the weighted cost function presented above, $\alpha$, $\beta$ and $\gamma$ are the parameters, which can be justified based on the resources usage consideration. Parameters $\alpha$ and $\beta$ reflect the weights used for the cost of network traffic, and $\gamma$ is the cost of the memory usage. For example, if the memory is more important than the bandwidth, then the value of $\gamma$ is increased to reflect the greater importance of memory.

In one embodiment, certain constraints are needed for the retrieval time value of web page rendering to the end user $t_b$ and the web page size $l_b$. Thus, a solution for $l_b$, $l_b$ and $l_b$ is a minimization problem of:

$$\min c = \alpha T_b + \beta(T_d + T_i) + \gamma(m_d + m_i)$$

subject to $t_b \leq t_0$ and $l_b \geq l_0$, $l_b \leq l_1$, where $t_0$ is the maximum delay allowed for web page rendering, and $l_0$ and $l_1$ are respectively the minimum and maximum numbers of data items allowed to be associated with meta information displayed on a web page. When the probability distribution of p(i) is known, we can find out the optimal values of $l_b$, $l_b$ and $l_b$ by solving the aforementioned minimization problem numerically.

6 Computing System

Figure 8:
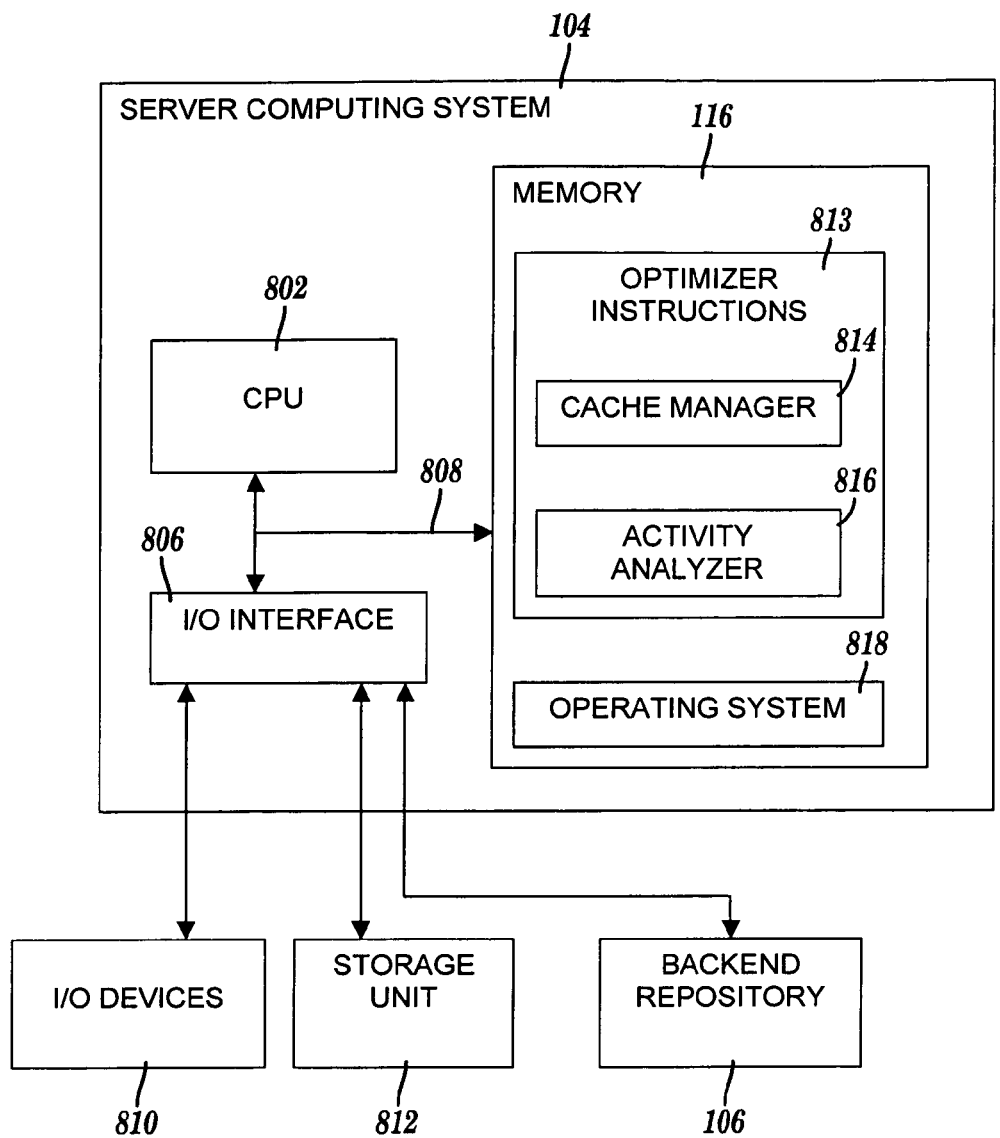
FIG. 8 is a block diagram of a computing system that is included in the system of FIG. 1 and that implements the processes of FIGS. 3, 4, 5A-5B 6A-6B, in accordance with embodiments of the present invention.

FIG. 8 is a block diagram of a computing system that is included in the system of FIG. 1 and that implements the processes of FIGS. 3, 4, 5A-5B and 6A-6B, in accordance with embodiments of the present invention. Server computing system 104 (a.k.a. computing system 104) generally comprises a CPU 802, a memory 116, an input/output (I/O) interface 806, and a bus 808. Computing system 104 is coupled to I/O devices 810, storage unit 812, and backend repository 106. CPU 802 performs computation and control functions of computing system 104. CPU 802 may comprise a single processing unit, or be distributed across one or more processing units in one or more locations (e.g., on a client and server).

Memory 116 may comprise any known type of data storage media, including bulk storage, magnetic media, optical media, random access memory (RAM), read-only memory (ROM), a data cache, a data object, etc. Cache memory elements of memory 116 provide temporary storage of at least some program code in order to reduce the number of times code must be retrieved from bulk storage during execution. Storage unit 812 is, for example, a magnetic disk drive or an optical disk drive that stores data. Moreover, similar to CPU 802, memory 116 may reside at a single physical location, comprising one or more types of data storage, or be distributed across a plurality of physical systems in various forms. Further, memory 116 can include data distributed across, for example, a LAN, WAN or storage area network (SAN) (not shown).

I/O interface 806 comprises any system for exchanging information to or from an external source. I/O devices 810 comprise any known type of external device, including but not limited to a display monitor, keyboard, pointing device, speakers, handheld device, printer, facsimile, etc. I/O devices can be coupled to computing system 104 directly or through I/O interface 806. Bus 808 provides a communication link between each of the components in computing system 104, and may comprise any type of transmission link, including electrical, optical, wireless, etc.

I/O interface 806 also allows computing system 104 to store and retrieve information (e.g., program instructions or data) from an auxiliary storage device (e.g., storage unit 812). The auxiliary storage device may be a non-volatile storage device (e.g., a CD-ROM drive which receives a CD-ROM disk). Computing system 104 can store and retrieve information from other auxiliary storage devices (not shown), which can include a direct access storage device (DASD) (e.g., hard disk), a magneto-optical disk drive, a tape drive, or a wireless communication device.

Memory 116 includes optimizer instructions 813 (i.e., program code) for optimizing resource usage in a multi-user information retrieval system. Optimizer instructions 813 include program code 814 for a cache manager and program code 816 for an activity analyzer. The cache manager and activity analyzer provide functionality of optimizer 112 (see FIG. 1). Memory 116 also includes an operating system (e.g., Linux) 818. Further, memory 116 may include other systems not shown in FIG. 8.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code 813 for use by or in connection with a computing system 104 or any instruction execution system to provide and facilitate the capabilities of the present invention. For the purposes of this description, a computer-usable or computer-readable medium can be any apparatus that can store the program for use by or in connection with the instruction execution system, apparatus, or device.

The medium can be an electronic-based, magnetic-based, optical-based, electromagnetic-based, infrared-based, or semiconductor-based system (or apparatus or device). Examples of a computer-readable medium include a semiconductor or solid state memory, magnetic tape, a removable computer diskette, RAM, ROM, a rigid magnetic disk and an optical disk. Current examples of optical disks include compact disk-read-only memory (CD-ROM), compact disk-read/write (CD-R/W) and DVD.

Any of the components of the present invention can be deployed, managed, serviced, etc. by a service provider that offers to deploy or integrate computing infrastructure with respect to the method of optimizing resource usage in a multi-user information retrieval system. Thus, the present invention discloses a process for supporting computer infrastructure, comprising integrating, hosting, maintaining and deploying computer-readable code into a computing system (e.g., computing system 104), wherein the code in combination with the computing system is capable of performing a method of optimizing resource usage in a multi-user information retrieval system.

In another embodiment, the invention provides a business method that performs the process steps of the invention on a subscription, advertising and/or fee basis. That is, a service provider, such as a Solution Integrator, can offer to create, maintain, support, etc. a method of optimizing resource usage in a multi-user information retrieval system. In this case, the service provider can create, maintain, support, etc. a computer infrastructure that performs the process steps of the invention for one or more customers. In return, the service provider can receive payment from the customer(s) under a subscription and/or fee agreement, and/or the service provider can receive payment from the sale of advertising content to one or more third parties.

The flow diagrams depicted herein are provided by way of example. There may be variations to these diagrams or the steps (or operations) described herein without departing from the spirit of the invention. For instance, in certain cases, the steps may be performed in differing order, or steps may be added, deleted or modified. All of these variations are considered a part of the present invention as recited in the appended claims.

While embodiments of the present invention have been described herein for purposes of illustration, many modifications and changes will become apparent to those skilled in the art. Accordingly, the appended claims are intended to encompass all such modifications and changes as fall within the true spirit and scope of this invention.

What is claimed is:

1. A method of optimizing information technology resource usage, comprising the steps of:
    a computing system generating a query, and based on the query, the computing system retrieving a plurality of descriptions of a plurality of data items included in the data repository and identified by a respective plurality of identifiers;
    the computing system loading into a first cache a first chunk of a plurality of chunks of the plurality of identifiers, wherein the first chunk is an ordered list of identifiers of the plurality of identifiers;
    the computing system loading into a second cache a first set of meta information that describes a first set of data items of the plurality of data items, wherein the first set of data items is identified by an ordered sub-list of identifiers of the ordered list of identifiers, and wherein the ordered sub-list of identifiers is a first sub-chunk within the first chunk;
    the computing system determining that a portion of the first set of meta information is being viewed via a web page by a user of a client computer in communication with the computing system via a network, wherein the portion includes a description of a data item of the first set of data items, and wherein the data item is identified by an identifier in the ordered sub-list of identifiers;
    the computing system determining a position of the identifier within the ordered sub-list of identifiers; and
    based on the position of the identifier within the ordered sub-list of identifiers, the computing system pre-loading a second set of meta information into the second cache, wherein the second set of meta information describes a second set of data items of the plurality of data items.

2. The method of claim 1, wherein the step of determining the position of the identifier within the ordered sub-list of identifiers includes the step of the computing system determining a nearness of the position of the identifier to an end of the ordered sub-list of identifiers by:
    the computing system determining a first number of identifiers in the ordered sub-list of identifiers between the position of the identifier within the ordered sub-list of identifiers and a position of a last identifier of the ordered sub-list of identifiers is less than a predefined quantity or
    the computing system determining a ratio of a first quantity to a second quantity is less than a predefined ratio, wherein the first quantity is the first number of identifiers in the ordered sub-list of identifiers between the position of the identifier within the ordered sub-list of identifiers and the position of the last identifier within the ordered sub-list of identifiers, and wherein the second quantity is a second number of identifiers in the ordered sub-list of identifiers between a position of a first predetermined identifier in the ordered sub-list of identifiers and a position of a second predetermined identifier in the ordered sub-list of identifiers.

3. The method of claim 1, further comprising the steps of:
the computing system determining that a portion of the second set of meta information is being viewed via a second web page by the user of the client computer, wherein the portion of the second set of meta information describes a data item of the second set of data items, and wherein the data item of the second set of data items is identified by a second identifier included in the ordered list of identifiers;
the computing system determining a position of the second identifier within the ordered list of identifiers; and
based on the position of the second identifier within the ordered list of identifiers, the computing system preloading a second chunk of the plurality of chunks into the first cache.

4. The method of claim 3, wherein the step of the computing system determining the position of the second identifier within the ordered list of identifiers includes the step of the computing system determining a nearness of the position of the second identifier to an end of the ordered list of identifiers by:
the computing system determining a first number of identifiers in the ordered list of identifiers between the position of the second identifier within the ordered list of identifiers and a position of a last identifier within the ordered list of identifiers is less than a predefined quantity, or
the computing system determining a ratio of a first quantity to a second quantity is less than a predefined ratio, wherein the first quantity is the first number of identifiers in the ordered list of identifiers between the position of the second identifier within the ordered list of identifiers and the position of the last identifier within the ordered list of identifiers, and wherein the second quantity is a second number of identifiers in the ordered list of identifiers between a position of a first predetermined identifier in the ordered list of identifiers and a position of a second predetermined identifier in the ordered list of identifiers.

5. The method of claim 1, further comprising the steps of:
the computing system receiving a set of usage patterns of a plurality of users of a respective plurality of client computers in communication with the computing system via the network;
the computing system organizing the plurality of identifiers into the plurality of chunks according to the set of usage patterns; and
the computing system separating the first chunk into a plurality of sub-chunks according to the set of usage patterns, wherein the first sub-chunk is included in the plurality of sub-chunks.

6. The method of claim 1, further comprising the steps of:
the computing system partitioning the second cache to include a part that includes a subset of the first set of meta information, wherein the subset of the first set of meta information is included in the web page; and
the computing system displaying the web page to the user of the client computer through a rendering process.

7. The method of claim 1, wherein the second set of data items is identified by a second sub-chunk of a plurality of sub-chunks included in the first chunk.

8. The method of claim 1, further comprising the steps of:
the computing system receiving a plurality of queries from a plurality of users of a respective plurality of client computers in communication with the computing system via a network;
in response to the step of receiving the plurality of queries, the computing system querying the data repository multiple times, wherein a result of the step of querying the data repository multiple times includes multiple groups of descriptions, wherein each group of descriptions describes a corresponding group of data items of multiple groups of data items, and wherein a group of data items of the multiple groups of data items is the plurality of data items;
the computing system loading a group of chunks into the first cache, wherein the group of chunks includes the first chunk;
the computing system loading multiple sets of meta information into the second cache, wherein the multiple sets of meta information include the first set of meta information;
the computing system updating one or more data items included in one or more groups of data items of the multiple groups of data items;
a backend layer of the computing system recording a timestamp indicating a time of the updating the one or more data items;
the backend layer generating a list indicating one or more changes resulting from the updating the one or more data items;
a middleware portion of the computing system receiving the list; and
based on the one or more changes resulting from the step of updating the one or more data items, the middleware portion updating a set of data selected from the group consisting of one or more chunks of the group of chunks and one or more sets of meta information of the multiple sets of meta information.

9. A computing system for optimizing information technology resource usage, the computing system comprising:
a central processing unit (CPU);
a memory coupled to the CPU;
a computer-readable, tangible storage device coupled to the memory, the storage device storing program instructions that when executed by the CPU via the memory:
generate a query and based on the query, retrieve a plurality of descriptions of a plurality of data items included in the data repository and identified by a respective plurality of identifiers;
load into a first cache first chunk of a plurality of chunks of the plurality of identifiers, wherein the first chunk is an ordered list of identifiers of the plurality of identifiers;
load into a second cache first set of meta information that describes a first set of data items of the plurality of data items, wherein the first set of data items is identified by an ordered sub-list of identifiers of the ordered list of identifiers, and wherein the ordered sub-list of identifiers is a first sub-chunk within the first chunk;
determine that a portion of the first set of meta information is being viewed via a web page by a user of a client computer in communication with the computing system via a network wherein the portion includes a description of a data item of the first set of data items, and wherein the data item is identified by an identifier in the ordered sub-list of identifiers;

determine a position of the identifier within the ordered sub-list of identifiers; and based on the position of the identifier within the ordered sub-list of identifiers, pre-load a second set of meta information into the second cache, wherein the second set of meta information describes a second set of data items of the plurality of data items.

10. The system of claim 9, wherein the program instructions which determine the position of the identifier within the ordered sub-list of identifiers include program instructions to determine a nearness of the position of the identifier to an end of the ordered sub-list of identifiers by:

determining a first number of identifiers in the ordered sub-list of identifiers between the position of the identifier within the ordered sub-list of identifiers and a position of a last identifier of the ordered sub-list of identifiers is less than a predefined quantity, or determining a ratio of a first quantity to a second quantity is less than a predefined ratio, wherein the first quantity is the first number of identifiers in the ordered sub-list of identifiers between the position of the identifier within the ordered sub-list of identifiers and the position of the last identifier within the ordered sub-list of identifiers, and wherein the second quantity is a second number of identifiers in the ordered sub-list of identifiers between a position of a first predetermined identifier in the ordered sub-list of identifiers and a position of a second predetermined identifier in the ordered sub-list of identifiers.

11. The system of claim 9, wherein the program instructions, when executed by the CPU via the memory:

determine that a portion of the second set of meta information is being viewed via a second web page by the user of the client computer wherein the portion of the second set of meta information describes a data item of the second set of data items, and wherein the data item of the second set of data items is identified by a second identifier included in the ordered list of identifiers;

determine a position of the second identifier within the ordered list of identifiers; and based on the position of the second identifier within the ordered list of identifiers, pre-load a second chunk of the plurality of chunks into the first cache.

12. The system of claim 11, wherein the program instructions which determine the position of the second identifier within the ordered list of identifiers include program instructions to determine a nearness of the position of the second identifier to an end of the ordered list of identifiers by:

determining a first number of identifiers in the ordered list of identifiers between the position of the second identifier within the ordered list of identifiers and a position of a last identifier within the ordered list of identifiers is less than a predefined quantity, or determining a ratio of a first quantity to a second quantity is less than a predefined ratio, wherein the first quantity is the first number of identifiers in the ordered list of identifiers between the position of the second identifier within the ordered list of identifiers and the position of the last identifier within the ordered list of identifiers, and wherein the second quantity is a second number of identifiers in the ordered list of identifiers between a position of a first predetermined identifier in the ordered list of identifiers and a position of a second predetermined identifier in the ordered list of identifiers.

13. The system of claim 9, wherein the program instructions, when executed by the CPU via the memory:

receive a set of usage patterns of a plurality of users of a respective plurality of client computers in communication with the computing system via the network;

organize the plurality of identifiers into the plurality of chunks according to the set of usage patterns; and separate the first chunk into a plurality of sub-chunks according to the set of usage patterns, wherein the first sub-chunk is included in the plurality of sub-chunks.

14. The system of claim 9, wherein the program instructions, when executed by the CPU via the memory:

partition the second cache to include a part that includes a subset of the first set of meta information, wherein the subset of the first set of meta information is included in the web page; and display the web page to the user of the client computer through a rendering process.

15. A computer program product for optimizing information technology resource usage, the computer program product comprising:

one or more computer-readable tangible storage devices; and program instructions stored on the one or more computer-readable tangible storage devices, the program instructions comprise:

program instructions to generate a query and based on the query retrieve a plurality of descriptions of a plurality of data items included in the data repository and identified by a respective plurality of identifiers;

program instructions to load into a first cache first chunk of a plurality of chunks of the plurality of identifiers, wherein the first chunk is an ordered list of identifiers of the plurality of identifiers;

program instructions to load into a second cache first set of meta information that describes a first set of data items of the plurality of data items, wherein the first set of data items is identified by an ordered sub-list of identifiers of the ordered list of identifiers, and wherein the ordered sub-list of identifiers is a first sub-chunk within the first chunk;

program instructions to determine that a portion of the first set of meta information is being viewed via a web page by a user of a client computer in communication with the computing system via a network, wherein the portion includes a description of a data item of the first set of data items, and wherein the data item is identified by an identifier in the ordered sub-list of identifiers;

program instructions to determine a position of the identifier within the ordered sub-list of identifiers; and program instructions, based on the position of the identifier within the ordered sub-list of identifiers, to pre-load a second set of meta information into the second cache, wherein the second set of meta information describes a second set of data items of the plurality of data items.

16. The program product of claim 15, wherein the program instructions which determine the position of the identifier within the ordered sub-list of identifiers include program instructions to determine a nearness of the position of the identifier to an end of the ordered sub-list of identifiers by:

determining a first number of identifiers in the ordered sub-list of identifiers between the position of the identifier within the ordered sub-list of identifiers and a position of a last identifier of the ordered sub-list of identifiers is less than a predefined quantity, or determining a ratio of a first quantity to a second quantity is less than a predefined ratio, wherein the first quantity is the first number of identifiers in the ordered sub-list of identifiers between the position of the identifier within the ordered sub-list of identifiers and the position of the last identifier within the ordered sub-list of identifiers and wherein the second quantity is a second number of identifiers in the ordered sub-list of identifiers between a position of a first predetermined identifier in the ordered sub-list of identifiers and a position of a second predetermined identifier in the ordered sub-list of identifiers.

17. The program product of claim 15, wherein the program instructions stored on the one or more computer-readable tangible storage devices further comprise:
   program instructions to determine that a portion of the second set of meta information is being viewed via a second web page by the user of the client computer, wherein the portion of the second set of meta information describes a data item of the second set of data items, and wherein the data item of the second set of data items is identified by a second identifier included in the ordered list of identifiers;
   program instructions to determine a position of the second identifier within the ordered list of identifiers; and
   program instructions, based on the position of the second identifier within the ordered list of identifiers, to pre-load a second chunk of the plurality of chunks into the first cache.

18. The program product of claim 17, wherein the program instructions which determine the position of the second identifier within the ordered list of identifiers include program instructions to determine a nearness of the position of the second identifier to an end of the ordered list of identifiers by:
   determining a first number of positions of identifiers in the ordered list of identifiers between the position of the second identifier within ordered list of identifiers and a position of a last identifier within the ordered list of identifiers is less than a predefined quantity, or
   determining a ratio of a first quantity to a second quantity is less than a predefined ratio, wherein the first quantity is the first number of identifiers in the ordered list of identifiers between the position of the second identifier within the ordered list of identifiers and the position of the last identifier within the ordered list of identifiers and wherein the second quantity is a second number of identifiers in the ordered list of identifiers between a position of a first predetermined identifier in the ordered list of identifiers and a position of a second predetermined identifier in the ordered list of identifiers.

19. The program product of claim 15, wherein the program instructions stored on the one or more computer-readable tangible storage devices further comprise:
   program instructions to receive a set of usage patterns of a plurality of users of a respective plurality of client computers in communication with the computing system via the network;
   program instructions to organize the plurality of identifiers into the plurality of chunks according to the set of usage patterns; and
   program instructions to separate the first chunk into a plurality of sub-chunks according to the set of usage patterns, wherein the first sub-chunk is included in the plurality of sub-chunks.

20. The program product of claim 15, wherein the program instructions stored on the one or more computer-readable tangible storage devices further comprise:
   program instructions to partition the second cache to include a part that includes a subset of the first set of meta information, wherein the subset of the first set of meta information is included in the web page; and
   program instructions to display the web page to the user of the client computer through a rendering process.

* * * * *